United States Patent [19]

Kohashi

[11] E Patent Number: Re. 33,525

[45] Reissued Date of Patent: Jan. 22, 1991

[54] TRANSFER RECORDING METHOD AND APPARATUS THEREFOR

[75] Inventor: Tadao Kohashi, Moriguchi, Japan

[73] Assignee: Matsushita Electric Industrial Co., Ltd., Kadoma, Japan

[21] Appl. No.: 418,726

[22] Filed: Oct. 3, 1989

Related U.S. Patent Documents

Reissue of:

[64] Patent No.: 4,541,042
Issued: Sep. 10, 1985
Appl. No.: 659,956
Filed: Oct. 11, 1984

U.S. Applications:

[63] Continuation of Ser. No. 94,771, Sep. 10, 1987, abandoned.

[30] Foreign Application Priority Data

Oct. 14, 1983 [JP] Japan ..... 58-192797
Mar. 22, 1984 [JP] Japan ..... 59-55424

[51] Int. Cl.[5] ..... G01D 15/00

[52] U.S. Cl. ..... 346/76 PH; 346/151

[58] Field of Search ..... 346/1.1, 76 R, 76 PH, 346/135.1, 105, 151; 400/120, 224.1, 224.2; 219/216 PH

[56] References Cited

U.S. PATENT DOCUMENTS 4,359,748 11/1982 Pasini et al. ..... 346/76 PH
4,415,903 11/1983 Kawanishi et al. ..... 346/101

FOREIGN PATENT DOCUMENTS 0150587 9/1982 Japan ..... 400/120

*Primary Examiner*—Arthur G. Evans
*Attorney, Agent, or Firm*—Cushman, Darby & Cushman

[57] ABSTRACT

Transfer recording is carried out by driving in press-contacting a recording medium, e.g. a paper and a recording material sheet such as an ink transfer sheet, in a gap between a platen and a thermal head, and improvement is to apply a solvent, e.g. of liquid state and having volatility, on said paper, thereby high speed thermo-dissolving transfer is made by heat of said heated points, and recording with continuous gradation is obtainable.

35 Claims, 10 Drawing Sheets

TRANSFER RECORDING METHOD AND APPARATUS THEREFOR

Matter enclosed in heavy brackets [ ] appears in the original patent but forms no part of this reissue specification; matter printed in italics indicates the additions made by reissue.

*This is a continuation of application No. 07/094,771, filed Sept. 10, 1987, which was abandoned upon the filing hereof, and which was a reissue of No. 06/659,956 filed Oct. 11, 1984 which issued as U.S. Pat. No. 4,541,042 on Sept. 10, 1985.*

BACKGROUND OF THE INVENTION

1. Field of the Invention

The present invention relates to an improvement in a recording method and recording apparatus for thermal transfer recording utilizing thermal recording head or the like.

2. Description of the Prior Art

There is known prior art of recording method, wherein recording medium and a transfer sheet comprising a base film on one face thereof having recording material such as ink to be transferred are provided, and by selectively raising temperature of the recording material by selective heating means or the like at a state of pressing the recording material, the recording material is transferred onto the above-mentioned recording medium to make recording.

In such kind of the conventional transfer recording, the recording is carried out in such a manner that melting point of at least one component material in the layer of the above-mentioned recording material is selected lower than a raised temperature, and by means of melting thereof the transfer is made on the recording medium. As representative recording apparatus, there is a thermal melting transfer recording apparatus wherein recordings of characters, figures or pictures are made by constituting the recording material from a colorant such as dye or pigment and binder of a low melting point and etc., and by making a transfer sheet of a so-called wax-type transfer sheet, made by coating the above-mentioned on a face of a heat resistive base sheet, such as thin capacitor paper or polyethylenetelephthalate sheet, and contacting a thermal recording head having a resistor element as heating points, the heat production being electrically controlled on the rear face of the transfer sheet, and selectively melting the binder through the base sheet by heating of the heater element, and thereby transferring the recording material on the recording medium such as paper.

In such kind of conventional recording apparatus, since the recording material media is heated from the rear face side of the base film, the melting starts from the contacting interface of the side of the base film, and only after melting of the side of the recording medium, the melted recording material is transfer-recorded on the face of the recording medium. Accordingly, since the transferring is carried out with outside heat energy of a value above a predetermined level to enable transfer, with a threshold level to produce incontinuous optical density of the recorded pattern, the conventional process can record only dual level optical density of recording without halftone gradation. Therefore, the conventional electric ink recording system has had a difficulty in reproducing picture having halftone optical density of the recording as its intrinsic problem.

Accordingly, in the conventional recording apparatus of thermal fusing type, in order to fulfil the present day's expanding needs for multi-gradation or continuous tone recording, optical density pattern process, dither process, digital gradation processing making multi-gradation recording with dual level optical density recoring, etc., are being studied.

In order to adopt such kind of multi-gradation or continuous tone recording, however, complicated signal processing circuit is usually needed, and the recording apparatus becomes expensive. Furthermore, the resolution of picture or recording speed decreases in inverse proportion to number of dots of the dual optical density recording in the matrix in dither process. The above-mentioned conventional multi-gradation recording methods are representing the optical density by number of dots in unit area. And accordingly, though they are multi-gradation recording, they can not produce image of continuous analog optical density in principle.

Furthermore, since the conventional thermal melting transfer recording apparatus controls heating of resistor element by current therein, its power consumption is large in comparison with its transferring capability, and a high speed recording is difficult. The breakthrough of the above-mentioned various problems have been subject of the technical study of the transfer recording.

SUMMARY OF THE INVENTION

The purpose of the present invention is to provide a method and apparatus for thermal transfer capable of continuous gradation which can produce picture with less input energy attaining higher optical density of transfer recording, or in other word, is capable of higher speed of transfer recording for equal optical density of produced picture.

Transfer recording method in accordance with the present invention comprises the steps of:

driving a recording medium in a predetermined direction, driving a recording material sheet, which comprises a base film and a recording material layer coated on one face of said base film, in substantially the same direction as that of the recording medium, in a state that the surface of the recording material layer is press-contacting to a face of the recording medium at least at a region whereon recording is to be made, applying a solvent in liquid state on at least one of the recording material layer and the recording medium, prior to the press-contacting of the surface of recording material layer to the face of the recording medium, the solvent having a lower melting point than a melting-transfer temperature of the as to dissolve at least one component of the recording material layer and such a solubility characteristic recording material, the solubility characteristic being that solubility increases as temperature rises, heating selected points of the recording material layer to a predetermined temperature thereby thermal-dissolving the selected points of the recording material layer by the solvent which is of or is made to liquid state, thereby selectively transferring thermo-dissolved selected points of the recording material layer onto the face of the recording medium, during a period of the heating to the predetermined temperature.

Selective thermal writing with the recording material is carried out from the rear side of the base film or from rear side of the recording medium therethrough by utilizing infrared rays, laser beam or the like optical energy or by thermal conduction from a thermal recording head or the like, using input energy from outside.

In the present invention, different in principle from the conventional thermal melting transfer recording method, a solvent material in liquid state is made contact the recording material layer, temperature of which is raised, thereby to dissolve at least one component of the recording material by the solvent with the help of raised temperature, thereby furnishing the recording material a function to be transferred on the recording medium.

The present invention utilizes positive temperature-solubility characteristic that the solubility increases as temperature rises with respect to thermo-dissolving characteristic of the recording material into the solvent, and thereby, continuous change of dissolving of the recording material is obtainable. Besides the above-mentioned conventional type transfer recording which utilizes thermo-dissolving characteristic, the ordinary simple thermo-melting transfer characteristic of the binder in the recording material may be also used.

For the solvent substance, it is not necessarily of liquid state in room temperature, and may be of solid state or other state, as far as when temperature is raised it changes into the liquid state and acquires capability of dissolving the recording material for at least one component of the recording material.

The solvent may be a single substance, or alternatively, may consist of plural components.

Furthermore, though full liquid state is preferable, other states of the solvent, for instance, that which includes some solid state component or some solvent in sol or gel state may be used, as far as having fluidity at the raised temperature.

For the colorant, ordinary pigment or dye is used for ordinary use for recording by ink transfer or characters or patterns, but for some other special use, for instance, for secret communication use or the like, non-visible but ultra ray-light emitting or the like special ink may be used.

DESCRIPTION OF THE PREFERRED EMBODIMENTS

Figure 1:
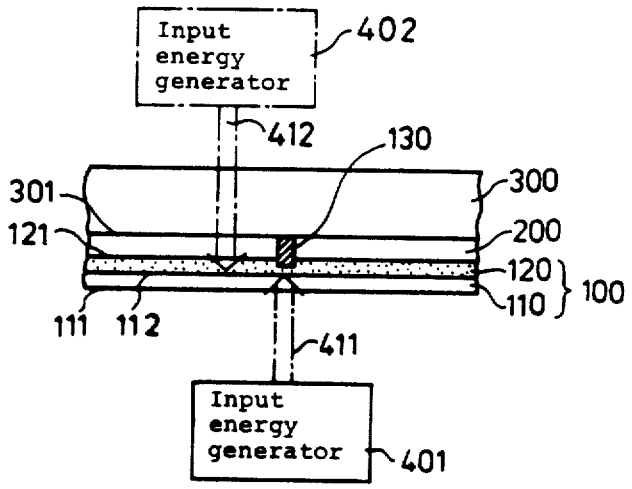
FIG. 1 is a schematic sectional view illustrating principle and fundamental method and apparatus embodying the present invention.

Hereafter, the present invention is described with reference to preferred embodiments shown in FIG. 1 and thereafter. As recording material of the present invention, for recording characters and patterns, either any one or their mixture of the following types may be pigment-binder, dye-pigment mixture with binder, used: pure dye, dye-binder, etc. Of course, the dye and the pigment as colorant or the binder may be those consisting of plural kinds of materials, or those which contains surfactant, plasticity agent, softening agent or other auxiliary agent may be contained in the binder. The binder in the recording material is defined as a material which is other than the colorant in the recording material.

Though it is preferable that in the above-mentioned four types of ink, it is preferable that both the dye and the binder have solubility into the solvent in liquid state; but the recording material comprising at least a dye or binder which is soluble in the liquid state solvent at a raised temperature is also usable.

That is, the recording material should be constituted in a manner that one part of the dye, in case of the pure dye type, one part of at least one of the dye or the of the binder in case of the pigmentbinder type, and one part binder in the dye-binder type, one part of at least one of the dye or binder, in case of the dye-pigment-binder type shows increasing solubility into the liquid state solvent material as the temperature rises. The reason is that, the recording material can be transferred on the recording medium by dissolving of one component thereof.

For colorant dye, when the liquid state solvent material is of aqueous property, acidic or basic or direct dying or the like water-soluble dye is usable; and when the liquid state solvent material is of oily state, solvent dyes are usable.

As pigment material, any of the organic pigment and inorganic pigment which have been used in the conventional thermo-melting transfer sheet and ordinary paints and printing inks are usable.

As the binder of the recording material, almost all binder material which are used in the ordinary paint, offset ink, gravure ink are usable. However, in case the colorant are preliminarily coated on sheet shaped base film and stored until use, in order not to produce irreversible hardening of the binder inducing the irreversible deterioration of the recording material, a binder of reversible melting material should be selected.

When the solvent is of aqueous property such as water, alcohol, glycol, etc., the binder is preferably aqueous resin for paint, for instance, alkyd resin, oil free alkyd resin, epoxy esther, acryl resin, melamine resin are preferable, and as available commercial product, Watersol (Trademark) manufactured by Dainippon Ink and Chemical, Inc. is usable. manufactured by Dainippon Ink and Chemical, Inc. is usable.

When the solvent is of non aqueous property, as the reversible melting binder, solid state resin is preferable; for instance, 100% phenol resin, denatured natural resin of phenoric acid such as pine resin, denatured natural resin of malic acid resin, denatured natural resin of pentaerythritol resin (for instance, Beckacite (Trade mark manufactured by Dainippon Ink and Chemical, Inc.)), petroleum resin (Nisseki-Neopolymer (Trade mark manufactured by Nippon Petrochemicals Co., Ltd.)), nitro cellulose, acetic cellulose, polyamide, polystyrol resin, or the like are usable.

The binder may be constituted by hot melt material having melting point of 60°-90° C. by utilizing such waxes as carnauba wax, oxide wax, paraffin wax, ester wax, similarly to those which have been used in the conventional thermo-dissolving-transfer recording. In such case, the colorant may be limited to pigments, but dye or mixture of dye and pigment may be used, and if necessary softening agent or other additive may be added to the binder.

As base film on which the recording material is coated, considering mechanical strength against distortion at the thermo-melting transfer, plastic film, cellulose fiber paper, plastic fiber paper or the like sheet type base film, or a roll of endless construction made by connecting both ends of such sheets, having thickness of 3.5-15 μm, is usable.

Conditions required for such base film has good conductivity for heat, radiation energy or incident energy, and its melting point should be higher than the raised temperature of the recording material at lowest, and the base film must have a resistivity not to be dissolved by the solvent in the liquid state, and preferably has relatively low ink acceptance in comparison with that of the recording medium so that the thermally melted recording material can be transferred onto the recording medium at ease; and as far as the above-mentioned conditions are fulfilled the base film material may be freely selectable, and it may be porous or non-porous.

Considering the above-mentioned conditions, usually, capacitor paper, glassine paper, PET film, polyimide film, cellophane film, or the like film are usable.

The recording material is coated on the base film in by forming fluid ink by using suitable solvent, or in a form of hot-melt state by using a hot-melt binder material thereby to form ink transfer sheet.

In this case, when use of the ink transfer sheet in plural times is intended, the recording material is coated on base film with porous face or on porous base film, so that the recording material is diffused into the porous base film.

When the ink transfer sheet is to be used as disposable one, a sheet type base film coated with the recording material is used; and when the base film is formed into an endless structure the above-mentioned recording material is re-coated prior to the thermal melting transfer recording on the surface of once used base film, thereby enabling repeated uses of the base film.

By providing an interface layer of synthetic resin between the recording material and the base film face, bonding strength of the recording material or thermal melting characteristic of the base film to the solvent can be improved. Furthermore, in order to improve bonding strength of the recording material for increasing of contact area of the recording material to the solvent for improving thermal melting characteristic, surface roughening treatment by applying corona treatment or sandblast process on the base film face, hence on the recording material face, is applied to produce many fine protrusions (for instance of 1-5 μm depth).

The above-mentioned surface roughening of the base film and the recording material induces increasing of contact area of the recording material to the solvent, and also an increasing of thermal melting, because sufficient amount of the solvent is held in the porous surface of the recording material, thereby resulting in good effect in improvement of transfer optical density.

Amount of the recording material to be coated on the base film is preferably around 1-15 μm in dried state as converted into depth. When the depth is too small, amount of the colorant to be thermally melted and transferred on the recording medium becomes smaller than 1 μm, thereby inducing insufficient recording optical density; and when the thickness is larger than 15 μm, the temperature rise corresponding to the input energy is insufficient and thermal melting of the colorant becomes insufficient resulting in unstable ink transferring in the transferring recording.

In the continuous gradation recording or full color recording, it is necessary that the recording material be thermo-melted and transferred in good fidelity, responding to the extent of temperature rise; and in such use recording material may be of pure dye type, or dye-binder type recording material in which both the dye and the binder are soluble to liquid state solvent. When weather-resistance and bleeding-resistance natures are required, pigment-binder type and dye-pigment mixture-binder type recording material composition are recommendable.

The above-mentioned composition can be also used in a compatible apparatus wherein the thermo-melting transfer recording method in accordance with the present invention and the conventional simple thermal transfer recording are compatibly usable.

In colorant-binder type recording composition, weight components of the mixture of colorant of dye-pigment and the binder is preferably selected in the range of 1:50 through 1:1 for colorant:binder, in weight ratio. When the amount of the colorant is smaller than the range, optical density of the recording is too small and when the amount of the colorant is larger than the range, the recorded image has insufficient gloss and poor weather resistance.

For the recording medium, any material can be used as far as its solubility in liquid state solvent is not too much; therefore plastic film or ordinary recording paper or printing paper is usable as the recording medium. When the recording medium is paper, both the ordinary paper and coated paper may be used depending on purposes.

The solvent is coated or held soaked on either face of the recording material or the ink transfer sheet from which the recording material (ink) is thermo-melted and transferred.

Conditions necessary for the solvent to be in fluid or liquid state under raised temperature of the recording material surface induced by the input energy, and to dissolve at least one component of plural component of the composition of the recording material, and to have positive thermo-dissolving characteristic, namely, the solubility of the dissolving rising as the temperature of the solvent rises. If the solvent is boiled up at raising of the temperature of the recording material, the quality of the transfer recorded image is liable to be lowered, and accordingly, the maximum temperature rise of the recording material should be lower than the boiling point of the solvent, and besides, it is preferable to select the boiling point of the solvent to be higher than the maximum temperature at the surface part of the recording material contacting the solvent. On the other hand, when the recording material is intended to be compatibly used in the conventional simple thermal transfer method, it is to be noted that the boiling point of the solvent should be selected higher than the temperature of the thermal transfer of the recording material, that is usually the melting point of the binder, in order not to prevent thermal dissolving of the recording material by the effect of heat of evaporation.

The solvent may be selected from the aqueous and non-aqueous ones, and single or mixture of plural ones depending on selection of the binder or dye to constitute the recording material.

The melting point of the solvent can be selected within a range with a maximum value selected as lowest surface temperature of the recording material when it is selectively heated by input energy for transfer recording. Accordingly, as far as satisfying the above-mentioned condition, solid state waxes such as solid state paraffin, carunauba wax, oxide wax, ester wax or petroleum resins or hot melt material such as organic resins, which are in solid state in the room temperature (for instance, roughly 0° C.–35° C.) can be used. In case the conventional simple thermal transfer recording is compatibly to be used, however, the melting point of the solvent should be selected lower than the melting point of the binder of the recording material, namely, the thermal transfer temperature.

The solvent is preferably in liquid state phase, or more preferably with volatility at room temperature (for instance, roughly 0° C.–35° C.), in order to be easily coated on the ink transfer sheet or recording medium and thermal solubility and for maintenance.

The color of the solvent is preferably transparent in order to prevent color change of the transfer recorded image, in case the solvent is in solid state too; but in case the solvent is a material having a high volatility at room temperature, the color must not be necessarily transparent.

In case the solvent is in liquid state at the room temperature, when its vapor pressure is too high, the period from coating of the solvent through thermal dissolving to peeling off of the ink transfer sheet from the recording medium becomes too short due to evaporation of the solvent, and controlling for satisfactory transfer recording becomes difficult. On the contrary, if the vapor pressure is excessively low, the recording medium with transfer recorded image by thermal dissolution is not dried for too long time, thereby resulting in poor resolution of the recorded image or in poor handling quality of the recorded sheet.

Accordingly, by considering the above conditions, the boiling point of the solvent is preferably selected between 60°–250° C. in the ordinary atmosphere (760 mmHg) and optimum range is 90°–200° C. Of course, as has been described, the lower limit of the boiling point is to be selected higher than the above-mentioned lowered limit when the conventional thermo-melting transfer process is compatibly used.

Retained solvent in the recording medium on which an image is thermo-dissolving tranferred can be removed by evaporation by heating with appropriate temperature given from the front face or rear face or both faces of the recording medium, or by blowing air depending on necessity. This is recommendable in view prevention of bleeding of the recorded image due to diffusion of transferred recording material and for safe storing.

In case the solvent is in solid state at ordinary temperature (for instance, roughly 0° C.–35° C.) or in a relatively low temperature of use (for instance, below 0° C.) and the solvent is coated or made soaked on the surface of recording material or recording medium prior to temperature raising for transfer recording, the solvent is coated by a hot roller or the like means, which is controlled to a temperature above the melting point of the solvent in an extent not to considerably melt the recording material which is other than the selectively heated part for writing. So that the solvent can be smoothly and stably coated in liquid state. And the temperature raising for recording, i.e., thermal dissolving transfer and subsequent peeling off of the ink transfer sheet from the recording medium is carried out in the state where the solvent at the part is retained in the melted liquid state.

In case a solid state solvent is used, unlike the case of using the solvent of liquid type in the ordinary temperature, it is possible to use the solid state solvent, which has been preliminarily coated on the surface of the recording medium or the recording material. And therefore the recording process appears as if a kind of dry process, and this process is recommendable in order to produce glossy transfer recording on ordinary paper.

It is to be mentioned that coating or soaking of the solvent onto the surface of the recording material by hot melt process or solution process is liable to make fog in transfer recorded image by undesirably dissolving the recording material to some extent during the coating and soaking process. Accordingly, in order to prevent the above-mentioned fog, coating and soaking of the solvent on the recording medium is a convenient method.

The solid state solvent can be stored on the surface of the recording material or ink transfer sheet by preliminarily coating or soaking for later use, without particular providing of a solvent coating means in the apparatus. The melting point of such solid state solvent is to be determined by considering input energy feeding means for temperature raise controlling, namely, controlling of temperature raising for transfer recording. In case the input energy is radiation energies, such as infrared rays or laser rays, the melting point can be simply above the room temperature, for instance, above 40° C., since the ink transfer sheet is heated in non-contact manner and temperature controlling is also done in that way.

In case, however, when the conventional thermal recording head with resistor elements as heating points are used to raise the temperature of the ink transfer sheet in contact manner, the upper limit of the temperature of the thermal recording head is determined by considering relation between thermal capacities of recording head and thermal capacities of the ink transfer sheet.

Known thermal recording head comprises latch circuit driver circuit, and like semiconductor element circuits; and the upper limit regulated temperature of the unit body is designed as about 80° C. Accordingly, the melting point of the solid state solvent is selected to be lower than the above-mentioned upper limit regulated temperature of 80° C. But the resistance elements is supplied with, at maximum, a recording signal power of about 1 W for each unit element, and therefor the resistance element is heated above 300° C. through in a short instance. Accordingly to usage in the present invention, the recording head body makes temperature rise of about 20° C. with ordinary heat diffusion cooling. Therefore, the temperature of the recording head body should be suppressed at highest at about 60° C. even during continuous operation. Besides, the solid state solvent must be already in melting state at that temperature. For this reason, the recommendable range of the melting point of the solid state solvent is in the range of 35° C.-60° C., more preferably 45° C.-55° C., considering that it is in solid state at ordinary temperature (at highest 35° C.). In case the conventional simple thermal melting transfer recording process is compatibly used, the melting point of the solid state solvent is selected to be lower than the preferable range of the melting point of the recording material (for instance, about 60° C.-90° C.).

Generally speaking, temperature controlling of the solvent in the present invention including the above-mentioned case of the solid state solvent is very important, since it induces direct influence on the optical density of the image of the thermal dissolving transfer recording method in accordance with the present invention.

The temperature control of the solvent is carried out by, contacting a temperature controlling roller on the rear side or front side of the recording medium, or controlling the temperature of the body of a thermal recording head in case it is used, or controlling the temperature of the solvent by the temperature of the body of the thermal recording head with the ink transfer sheet therebetween, or controlling the temperature of recording platen consisting of metal or rubber or their combination pressing the recording medium to the surface of the recording material, or appropriately combining more than two of the above-mentioned controlling. Among the above-mentioned controlling methods, the last mentioned controlling method, which controls temperature of the solvent through the temperature controlled recording platen, is most recommendable method in view of the construction of the apparatus.

When the melting point of the solid state solvent is selected in such a low temperature range as about 45° C.-55° C. in order for compatible use in the conventional thermal recording head, there is a liability of bleeding of the recorded image or the sticking of the recording material to any substance contacting thereon when stored for a considerable time. This problem can be solved by constituting the thermal recording head in such manner that resistance elements as heating points arranged in a line or row are disposed on the rear face of the recording medium, or on the front face thereof. And then the ink transfer sheet is contacted when recording, and the resistance elements in a row are electrified to be heated intermittently in synchronism with main scanning recording signal, while driving the recording medium and the ink transferring sheet in a direction substantially perpendicular to the row of the resistance elements. By such configuration and operation the area of heating being limited to small points, while reducing undesirable influences of the heating to the whole recording head structure; thereby selection of the melting point of the solvent above about 60° C. becomes possible. In this case, melting point of the recording material is selected to be higher than the above-mentioned melting point (about 60° C.) of the solvent, thereby the thermo-dissolving transfer recording becomes principal operation in the transfer. Melting point of the solvent should be selected to be lower than the raised temperature of the resistance elements of the recording head; and care should be made, in order to prevent fog in the transfer recorded image under the state of the above-mentioned low melting temperature, the thermo-dissolving characteristic of the recording material should be appropriately selected in a manner that the thermo-dissolving amount does not cause the fog. Or alternatively, the time from the solvent's touching the recording material to the ink transfer sheet from the recording medium should be selected sufficiently short.

Conditions for the recording medium, the base film, the recording material, the ink transfer sheet, and the solvent are as follows.

(a) At the time of controlling of selective temperature raising of the recording materials responding to input energy or during a short time period thereafter when the raised temperature remains high, the solvent is made to contact or pressed through the base film onto the face of the recording material.

(b) The solvent material is soaked at least in the recording material or on the face of the recording medium facing the recording material, or alternatively the solvent is coated or soaked to that or those during the process of transfer recording in accordance with the present invention.

Accordingly, in case the solvent is placed only on the recording medium, it is made to contact or made soaked from the recording medium to the recording material only by contacting or pressing between the recording medium and the recording material.

In case the recording medium is a non-porous substance, the solvent is coated on the side of the recording medium facing the recording material; and in case the recording medium is of porous substance, the recording medium can be coated from any sides of the recording medium and be soaked to the surface facing the recording material.

(c) In the above-mentioned (a), for a time period necesary for the transfer recording after the thermo-dissolving of the recording material by solvent, the surface of the recording material on the ink transfer sheet is retained in contact or pressed state onto the surface of the recording mediu, and after a while the recording medium and the ink transfer sheet are peeled off each other.

(d) During the time period from the temperature-raising to the peeling off of the ink transfer sheet from the recording medium, in order to prevent undesirable dissolving of the recording material at the parts which are not selectively temperature-raised by the input energy to the recording medium, or in order to substantially minimize the undesirable transferring amount of the recording material to the recording medium into negligible small, the material of solvent and related process are carefully designed. By such careful designing, undesirable fog on transfer recorded image to lower the picture quality due to excessive transferring of the recording material onto the recording medium at nontemperature-raised parts is prevented.

In order to remove the fog, such solvent is selected such that solubility of the recording material by the solvent at non-temperature raised parts is very small or zero. Alternatively, a very short time period from the contacting of the solvent to the recording material to peeling off of the ink transfer sheet from the recording medium, is selected within such short time period that the dissolving amount of the recording material by the solvent does not yet make trouble on the transfer recorded image quality. In view of prevention of the breaking of the recording medium or recording material at the peeling off, the peeling off is preferablly made prior to the solvent loosing fluidity.

Recording method and recording apparatus in accordance with the present invention is embodied by combining above-mentioned conditions (a) through (d).

The following points should be born in mind in order to obtain good recorded image by preventing fog transfer in embodying the present invention.

When the solvent is in solid state in the ordinary temperature, by considering prevention of fog due to undesirable dissolving of the recording material by temperature change in the coating state or subsequent stocked state, the solid state solvent is preferably coated or made soaked on or in the recording medium rather than on the face of the recording material. In order for coating and soaking of the solvent which is in liquid state in ordinary temperature, the coating and soaking should be carried out in as short time as possible prior to application of the input energy for transfer recording.

Especially to avoid fogged image and to produce high quality recorded image, the coating and soaking is done preferably on the recording medium only. The application and soaking may be done immediately prior to the temperature raising or more earlier, as far as there is no fear that the solvent volatiles too much.

In any of the above-mentioned cases, the contacting and pressing of the recording material and the recording medium is preferably done immediately before the temperature raising, as far as the contacting and soaking of the solvent onto the recording material is being done; and the contact and pressing process are retained until the above-mentioned peeling off process after the temperature raising.

During the contacting and pressing process, the above-mentioned thermal dissolving transfer of the recording material onto the face of the recording medium is carried out.

In order to attain even thermal dissolving transfer recording on a recording medium such as recording paper or a plastic sheet, the solvent must contact to and thermally dissolved for a predetermined time period. In order to achieve this, it is preferable to carry out writing in frame sequence manner with input energy by the recording material and the solvent onto the recording medium, or alternatively to carry out writing in a direction to cross the driving direction of the recording medium in scanning way with input energy to raise temperature; or alternatively to carry out transfer in time sharing way or in parallel manner of line sequence with plural set of recording head elements disposed across widths of the ink transfer sheet. In the above-mentioned transfer writings, the driving of the recording medium may be made in continuous way or in intermittent way in synchronism with period of the input energy signal.

For the recording medium, plastic films, ordinary recording papers, or the like of non-porous type or porous-type may be used.

In order to attain recording in good gradation with high sensitivity by the thermo-dissolving method, good cares should be taken on the amount of the solvent which contacts to recording material and the recording medium at the position of between them, as well as the heat capacity and specific heat of the solvent, the recording medium and the recording material as total system.

For instance, when the amount of the solvent is small, the amount of the recording material which can be thermo-dissolved in low temperature is small; and on the contrary, when the conventional thermal melting transfer process is auxiliarily utilized, too high optical density recording is produced at a high temperature operation, and therefore the recording characteristic is influenced too much by the high temperature side, and latitude of the recording becomes narrow, and the recorded image showed high $\gamma$ value.

On the other hand, when the amount of the solvent is appropriate, even in the low temperature range the recording material is thermally dissolved and its absolute amount becomes large. Therefore, the latitude becomes broad from the low temperature range to high temperature range along the thermo-dissolving characteristic curve, and transfer recording of good gradation characteristic with low $\gamma$ value is obtainable.

When the solvent is fed too much, the heat capacitance of the total system including the recording medium becomes too large. Accordingly, the temperature raising of the solvent by the temperature raising means becomes insufficient, and thermo-dissolved amount becomes also insufficient, and therefore, though the latitude is broad and the $\gamma$ is low, a high optical density recording becomes difficult.

In order to improve the above problem, the following method is effective. When the recording medium is non-porous film such as ordinary plastic film, by means of sandblast method or by knowm embossing method, very minute recesses or embosses of about 1–10 $\mu$m depth are provided with sufficiently high density than the recording dot density (ordinarily 5–16 dots/mm), or alternatively a mat coating containing calcium carbonate powders on the surface of the film. Then, the solvent is retained in the embosses of the above-mentioned embossed surface or mat coated surface.

On the other hand, when the recording medium is a porous material such as ordinary recording paper, to prevent excessive impregnation of the solvent in the pores of the recording medium or to prevent decrease of optical density of recording due to diffusing of the thermo-dissolved recording material into pores, or further to prevent penetrating of the solvent through the recording medium, it is preferable that starch or polyvinylalcohol resin or the like is coated on the rear side of the recording medium, thereby to change it to substantially impermeable to the solvent. Alternatively, an oil barrier may be formed on the rear side of the recording media by coating fluoro-resin or surfactant of fluororesin system to repel the solvent, thereby to control penetration or soaking amount or diffusing depth of the solvent in the recording medium.

The above-mentioned treatments on the recording medium is applicable for both cases of the liquid type solvent and solid type solvent to be applied on the recording medium.

According to the present invention, by changing colors of the recording material on the ink transfer sheet, transfer recording of plural color image is obtainable with the single recording head or with plural recording head.

By superposedly making plural transfer recordings with different color, multi-color recording is obtainable.

In this case, by selecting the colors of three primary colors, namely, cyan, magenta and yellow, and depending on necessity, black, and by sequentially transfer-recording the above-mentioned colors with single or plural recording heads, a full color picture recording is obtainable.

The recording materials of different colors may be provided on the same ink-transfer sheet in spacial periodic repetition or on an endless loup-shaped ink-transfer sheet in spacially periodic repetition manner. In such cases, in order to obtain faithful color reproduction, it is necessary that the recording material of the different primary colors must be thermo-dissolving transferred at the exact positions as predetermined period.

An effective means to attain such accurate color registration in the transfer recording is given by providing transferrecorded markers on a margin part of the recording medium responding to recording signal in the line-sequential thermo dissolving transfer process of the first color recording material on the recording medium, and in the second or subsequent thermo-dissolving transfer recording of the different color recording material. The above-mentioned markers are photoelectrically detected, and by utilizing the electric signals the registration controling can be done.

Concrete Embodiment

Hereafter, description is made on concrete embodiments based on the above-mentioned configuration of the recording method and the recording apparatus in accordance with the present invention in reference to the drawings.

FIG. 1 is a cross-sectional structure of one embodiment of a recording method and recording apparatus in accordance with the present invention, showing the principle.

In this figure, 100 is an ink transfer film wherein a colored layer-shaped recording material 120 is coated on the surface of a sheet-shaped base film 110, and on this film a recording medium 300 is pressure-contacted through a liquid solvent material 200.

401 is an apparatus for generating and controlling an input energy which generates and controls an input energy 411 making selective thermal writing control of the recording material and further the solvent material through the base film 110 by means of heat conduction, radiation energy or the like of a thermal recording head apparatus, $CO_2$ gas laser apparatus, or the like.

In another embodiment, a similar apparatus 402 as that of the apparatus 401 may be provided so as to generate and control an input energy 412 from back side face of the base film 100.

This figure illustrates a process of writing by raising temperature by means of the input energy 411.

Figure 2:
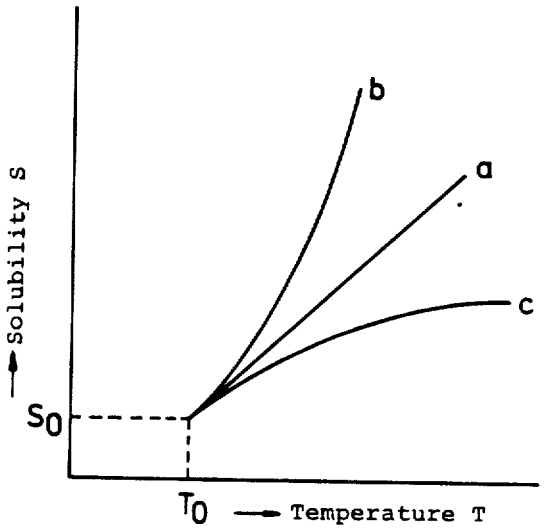
FIG. 2 is a graph showing several curves of solubility for different solvents to recording material for use in the transfer recording method and transfer recording apparatus in accordance with the present invention.

FIG. 2 shows one example of the solubility curve for the solvent material in liquid state which is a constituent of the recording material in the recording method and the recording apparatus in accordance with the present invention.

In this graph, the abscissa is graduated with the temperature T of one constituent in the recording material 120 and the liquid state solvent material 200 contacting therewith, and the ordinate is graduated with the saturation solubility of the recording material into the liquid state solvent material.

In the present invention, as shown by characteristics a, b and c in the graph, materials are selected respectively so that the solubility S will be increased for the temperature T.

Accordingly, in FIG. 1, at a part whereto the input energy 411 is applied, the recording material 120 and the liquid state solvent material 200 contacting with a recording material surface 121 undergo a selective control of the recording by raising the temperature corresponding to this energy quantity, and thereby the recording material 120 itself or the constituent thereof is thermally dissolved corresponding to this temperature, and then a thermally dissolved recording material 130 in a solution or suspension state whereto an ink transfer recording function is given is formed. The quantity of this thermally dissolved recording material 130 is an increasing function of the intensity or pulse width of the input energy 411.

Accordingly, when the pressure-contacted recording medium 300 is peeled off the ink transfer film 100 in a liquid state of the solvent material 200, the colored recording material 130 is ink-transferred and recorded on the surface of the recording medium 300 with the optical density corresponding to the intensity or pulse width of the input energy 411.

In this case, when the solubility curve is linear as shown by the characteristic curve a in FIG. 2 the gamma value is close to 1, and when the solubility curve is a super linear one as shown in the characteristic curve b in FIG. 2, the gamma value is larger than 1, and on the contrary, when the solubility curve is sub-linear as shown by the characteristic curve c, the gamma value is smaller than 1; and any of the characteristics is obtainable by selecting the materials 120 and 200, and thus a recording of continuous tone can be carried out unlike the conventional ink transfer recording method employing thermal melting.

Furthermore, taking the temperature of the surface 121 of the recording material in the non-temperature-rising part whereto no input energy 411 is applied and the liquid state solvent material 200 contacting therewith as $T_0$, as shown in FIG. 2, if the saturation solubility $S_0$ is large, the recording material 120 is dissolved and transferred onto the surface 301 of the recording medium also in the non-temperature-rising part although the optical density thereof is low, resulting in producing the so-called fogged ink transfer. This fogged ink transfer phenomenon can be prevented in such a manner that the materials 120 and 200 are so selected that the solubility $S_0$ will be extremely small or zero, or the time of period during which the liquid state solvent material 200 is brought in contact with the surface 121 of the recording material and then undergoes a selective thermal control process by means of the input energy 411 and thereafter the recording medium 300 is peeled off the ink transfer film 100 is so selected as to be shorter than the time dopants of period during which the solubility reaches the one corresponding to the fogged ink transfer causing a trouble.

[Recording Material Example 1]

In the case of the so-called pigment-hotmelting binder type recording material for thermal-melting ink transfer recording, for instance, the recording material 120 comprising 20 wt % of a pigment as a colorant for magenta, cyan, yellow, black or the like, 20 wt % of carunauba wax and 40 wt % of ester wax as a binder, and about 20 wt % of oil as a softener and other dopants, whose melting temperature is about 70° C. and whose thickness is about 4 μm, when trichloroethylene (boiling point 87° C., melting point −86° C.) or xylene (boiling point 138°-144° C.) is used as the solvent material 200, at the temperature T=27° C., dissolution is scarcely takes place within two seconds of contact with the recording material 120, and therefore no fogged ink transfer takes place. And effective thermo-dissolving ink transfer recording starts at T>40° C.

[Recording Material Example 2]

In this case where the recording material 120 of magenta, cyan, yellow or black pigment—binder type of about 2-10 μm each in thickness is used which comprise 75 wt % of natural resin denatured maleinoid resin having a melting point of about 90° C. (for instance, Beckacite F-266 made by Dainippon Ink and Chemical Inc.) and, for example, as a colorant, 25 wt % of C.I.-Solvent Red 49 of xanthane series, C.I.Solvent Blue 25 of phthalocyan series, C.I.Solvent Yellow 16 of monaazo series, or C.I.Solvent Black 3 of diazo series, the recording material is scarcely dissolved in the solvent material 200 composed of, for example, liquid state polyethylene glycol (for instance, Polyethylene glycol #200 made by Kanto Chemical Co., Ltd.) during two seconds of contact at 27° C. of room temperature, and therefore any fogged ink transfer can be prevented, and a high optical density of thermo-dissolving ink transfer can be carried out at 50° C. or more corresponding to the rise in temperature.

[Recording Material Example 3]

Furthermore, the pigment-binder type color ink for gravure printing having a softening point of 150° C. or more, wherein the binder material is, for example, of nitrocellulose series and 14–20 wt % of pigment is added thereto, (for instance, NA-N 370 (magenta) for G cellophane, NA-N 800 (cyan color), NA-N 260 (yellow color) or NA-N 1000 (black color) manufactured by Sakata Shokai, Ltd.) is dissolved a little at a layer thickness of 2-10 μm in, for example, cyclohexanon (boiling point 155° C., melting point −45° C.) being the solvent material 200 during two seconds of contact at 27° C. of room temperature, but the dissolved amount thereof is negligible, and therefore a high optical density of thermol-dissolving ink transfer can be carried out at 50°-70° C. or more corresponding the temperature thereof.

[Recording Material Example 4]

The recording material 120 wherein a pigment of magenta, cyan, yellow or black is mixed by 14–20 wt % each into the binder material such as oxide wax, for example, polyethyleneglycol ahving a mean molecular weight of 19,000 (for instance, PEG #20,000 made by Nippon Oil and Fats Co., Ltd.) is scarcely dissolved during two seconds of contact at 27° C. of room temperature when the solvent material 200 is water, and therefore no fogged ink transfer takes place and the thermo-dissolving ink transfer can be carried out at 45° C. or more.

[Recording Material Example 5]

The recording material 120 wherein a pigment of magenta, cyan, yellow or black is mixed by 14–20 wt % each into the binder material, for example, hydrocarbon resin of fatty series having a mean molecular weight of 1200 and a softening point of 100° C. (for instance, Hi-rez G-100X made by Mitsu Petrochemical Industries) is scarcely dissolved during two seconds of contact at 50° C. whereat solid paraffin is liquefied when the solid paraffin which is solid at room temperature and has a melting point of 44°-44° C. is used for the solvent material 200, and therefore the thermo-dissolving ink transfer recording can be performed at 70° C. or more.

Furthermore, the thermo-dissolving ink transfer recording can be performed in a liquefied state of solid paraffin which is the solvent material 200 by replacing the binder material with one having a higher melting point than that of the solvent material 200, for instance, solid paraffin having a melting point of 66°-70° C., microcrystalline wax having a high softening point (for example, Hi-Mic-#2095, softening point 96° C., made by Nippon Seiro Co., Ltd.), or Esmac #180, softening point 84° C., made by Exson Corp.).

These recording materials 120 are coated to form a layer on the base film 110 composed of a heat resisting transparent film of about 3.5–15 μm in thickness such as polyethylene-telephthalate (PET), cellophane, biaxial stretched polyvinylalcohol or the like or composed of a heat resistive semitransparent paper of the same thickness as the above such as condenser paper, glassine paper or the like.

Thus, in FIG. 1, the ink transfer film 100 and the recording medium 300 are pressure-contacted and fixed, and the thermal recording head which is publicly known as the apparatus 401 is pressure-contacted on a back surface 111 of the base film to perform mechanical scanning, or a noncontact collected light scanning is performed in an optically linear fashion by arranging a number of semiconductor laser devices, near infrared light emitting diode devices such as GaP or the like in a linear fashion, or an infrared laser beam such as $CO_2$ gas laser or the like is scanned in a noncontact fashion through a polygon mirror or an electric element, and thereby within the time of period not causing the above-mentioned fogged ink transfer, the thermal control writing of the recording material 120 and the solvent material 200 with the recording material 120 are performed in a frame sequence and then these are peeled off, and thereby characters, figures or pictures of multi-graduation are recorded on the surface 301 of the recording medium with an ink transfer recorded optical density corresponding to the raised temperature of the materials 200 and 120.

Or in the above-mentioned method, the solvent material 200 is coated on either or both of the surface 121 of the recording material and the surface 301 of the recording medium while the transfer film 100 and the recording medium 300 are moved at the same speed in the same direction, and immediately thereafter the ink transfer film 100 is pressure-contacted with the recording medium 300, and then the thermal writing control is performed by the line sequence or by the beam scanning in the direction orthogonal to the direction of movement thereof by means of the input energy 411 composed of the above-mentioned thermal conductivity or radiation energy, and then the ink transfer film 100 is peeled off the recording medium 300 before any fogged ink transfer takes place, and thereby characters, figures or multi-graduation pictures can be recorded by the thermo-dissolving ink transfer in the line sequence.

In the recording method and the recording apparatus in accordance with the present invention, the principle thereof is a recording by the thermo-dissolving ink transfer, and therefore control of temperature rise at the contact boundary between the recording material 120 and the solvent material 200 has only to be made. And thereby the thermo-dissolving ink transfer can be performed corresponding to that rise in temperature, therefore greatly differing intrinsically from the conventional thermo-melting recording method wherein the ink transfer is performed only after a large melting heat is supplied by the input energy 411.

Accordingly, as long as the control of rise in temperature can be made, as shown in FIG. 1, even when the input energy generator 401 is installed at the back side of the recording medium 300 like 402 and an input energy 412 composed of thermal energy or radiation energy such as rays of light or the like is supplied by conduction to or transmission through the recording medium 300, the thermo-dissolving recording material 130 thereof can be transferred and recorded on the surface 301 of the recording medium.

For example, in the figure, when the recording medium 300 is a light-transmitting plastic film, the thermo-dissolving ink transfer can be performed by light-rays energy for the input energy 412 like the input energy 411 as described previously, and thereby a manuscript film for the slide film or the overhead projector can be easily prepared. Furthermore, in the case of a heat resisting and light-transmitting or opaque plastic film, recording paper or the like, contact thermal recording can be made on the back side of the recording medium by utilizing the thermal recording head.

Figure 3:
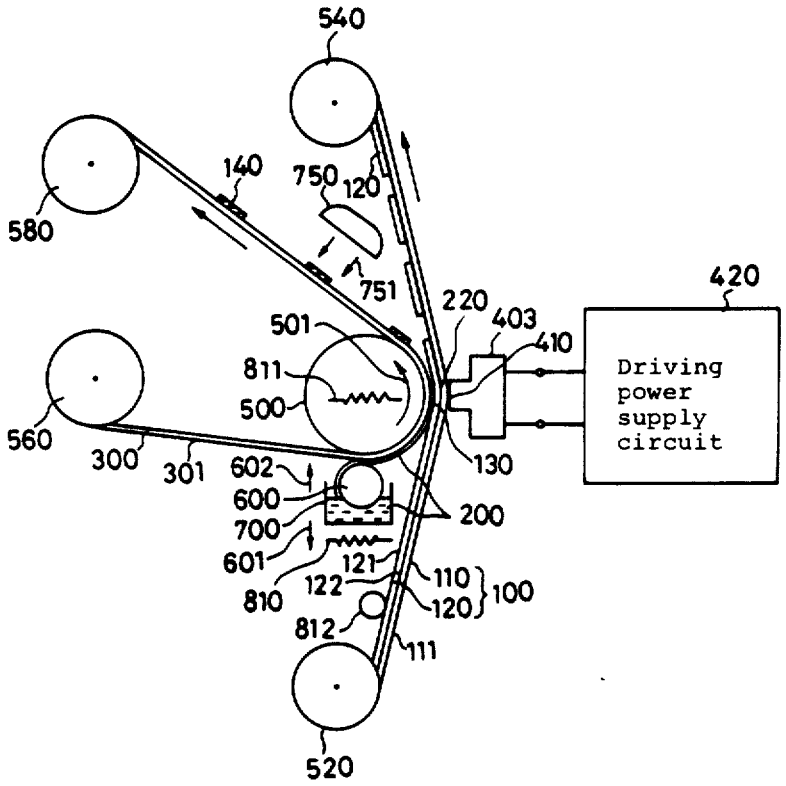
FIG. 3 is a sectional view of an actual embodiment of transfer recording method and transfer recording apparatus embodying the present invention.

FIG. 3 ia a cross-sectional structural view showing another embodiment of the recording method and the recording apparatus in accordance with the present invention.

The ink transfer film 100 and the recording paper 300 are pressure-contacted between a rubber recording platen 500 rotating intermittently by a synchronous motor (not illustrated) and a publicly-known thermal recording head 403, and both of them are fed at the same speed by the rotation as shown by an arrow mark 501 of the recording platen 500 synchronized with the line sequential thermal writing by means of the head 403 corresponding to a recording signal from a driving power supply 420.

520 is an ink transfer sheet roll, 540 is a roll for taking up an ink transfer sheet, 560 is a recording paper roll, and 580 is a roll for taking up a recording paper.

700 is a solvent material container for accomodating the solvent material 200 and a solvent material coater 600 which coats the solvent material on the surface 301 of the recording medium. The coater 600 is movable and when it moves as shown by an arrow mark 602, the solvent material 200 is coated or the surface 301 of the recording medium as shown by the figure, and when it moves as shown by an arrow mark 601, the coater is parted from the surface 301 and no coating is performed.

Figure 4:
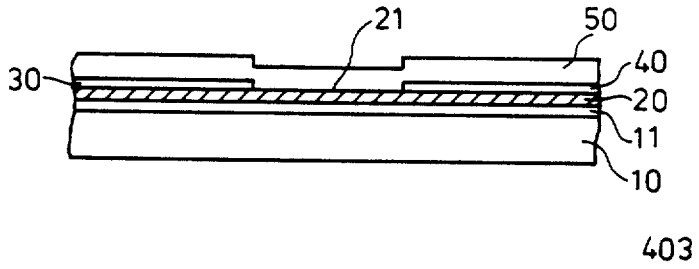
FIG. 4(a) is a sectional view of one example of thermal recording head of transfer recording apparatus embodying the present invention.
FIG. 4(b) is a plan view showing configuration of the thermal recording head shown in FIG. 4(a).
Figure 4:
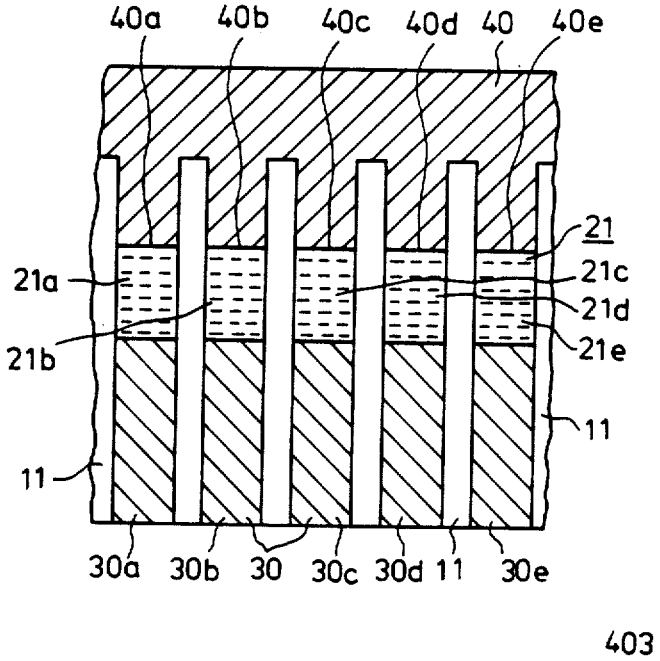

FIG. 4 is a view of a cross-sectional structure a and a planar structure b showing one example of the publicly-known thermal recording head 403 which is used in FIG. 3.

10 is, for example, an alumina substrate having a glass-glazed layer 11 on the surface thereof, 20 is a film of resistance heating element such as Ta, Ni-Cr alloy, tantalum nitride ($Ta_2N$), Si-Ta alloy whose primary component is $TaSi_2$, Ta-$SiO_2$, Cr-$SiO_2$-O, or the like which is provided on the surface of the substrate 10, 30 is a a signal electrode, and 40 is a counter electrode and they are in contact with the film 20 and face each other with a space kept and this space part forms a resistance heating element 21 which generates heat corresponding to a signal voltage applied across these electrodes. 50 is a layer for protection against oxidation and wear-out, which is composed of silicon carbide (SiC) or the like.

FIG. 4(b) is a fragmental planar structural view as seen from the upper side of the electrode 30 and 40 and the element 21, that is, the layer 50 side in FIG. 4(a). The signal electrode 30 and the counter electrodes 40 are formed in such a manner that Cr is vacuum-evaporated thinly on the film of resistance heating element 20 and thereon Au is further vacuum-evaporated thickly by about 1 μm, and then these are etched together with the film of resistance heating element 20 by the publicly-known etching technique as exemplified in the figure.

The counter electrode 40, for example, forms a common electrode having comb-type electrode pieces 40a . . . 40e as shown in the figure. The signal electrode 30 forms narrow-belt-shaped electrodes 30a . . . 30e which face the electrode pieces 40a . . . 40e and are insulated from each other, and thereby the resistance heating element 21 composed of rectangular heating elements 21a . . . 21e which are insulated from each other is formed.

When a signal voltage is applied selectively to the signal electrodes 30a . . . 30e from the driving power supply apparatus 420 in FIG. 3, with respect to the counter electrode 40, the heating elements 21a . . . 21e generate Joule heat and raise the temperature thereof corresponding to the amplitude or pulse width of this signal voltage, and thereby the thermo-sensitive recording is performed. Recording dot density is determined by the density of arrangement of the above-mentioned heating elements 21, being normally selected about from 4 lines/mm to 16 lines/mm.

Figure 5:
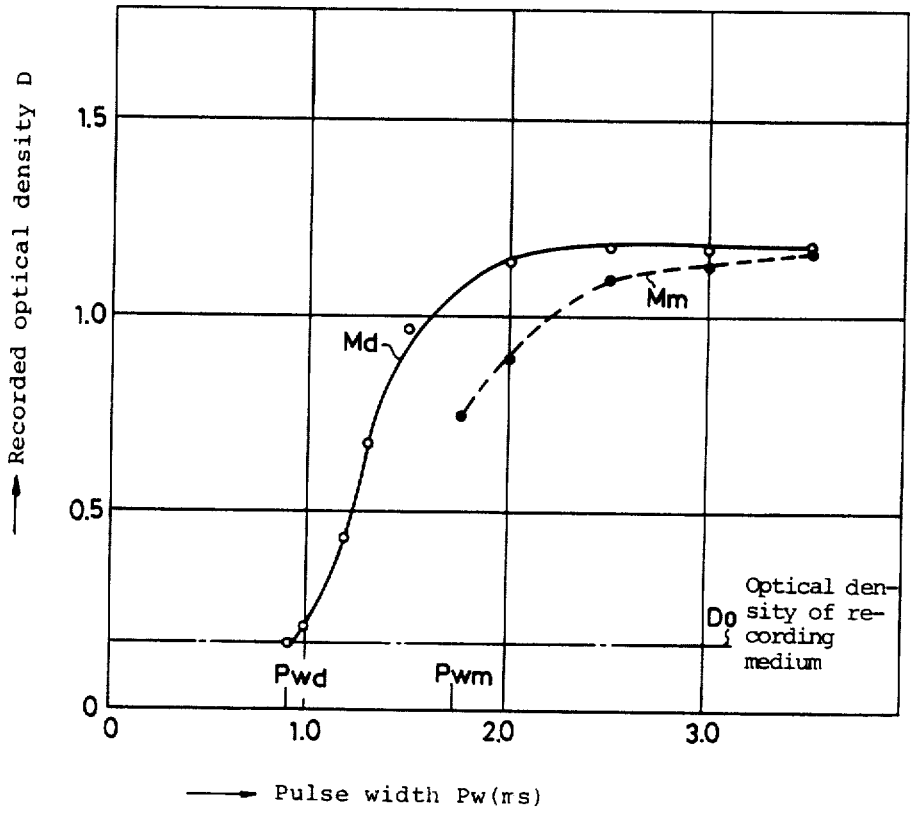
FIG. 5 is a graph showing characteristic curves of experiments of the apparatus of FIG. 3. In the graph, solid line curve Md is a curve for the experiments when a magenta color ink transfer sheet is utilized, and dotted line curve Mm is a curve for comparison example for the conventional simple thermal transfer recording which does not use a solvent.
Figure 6:
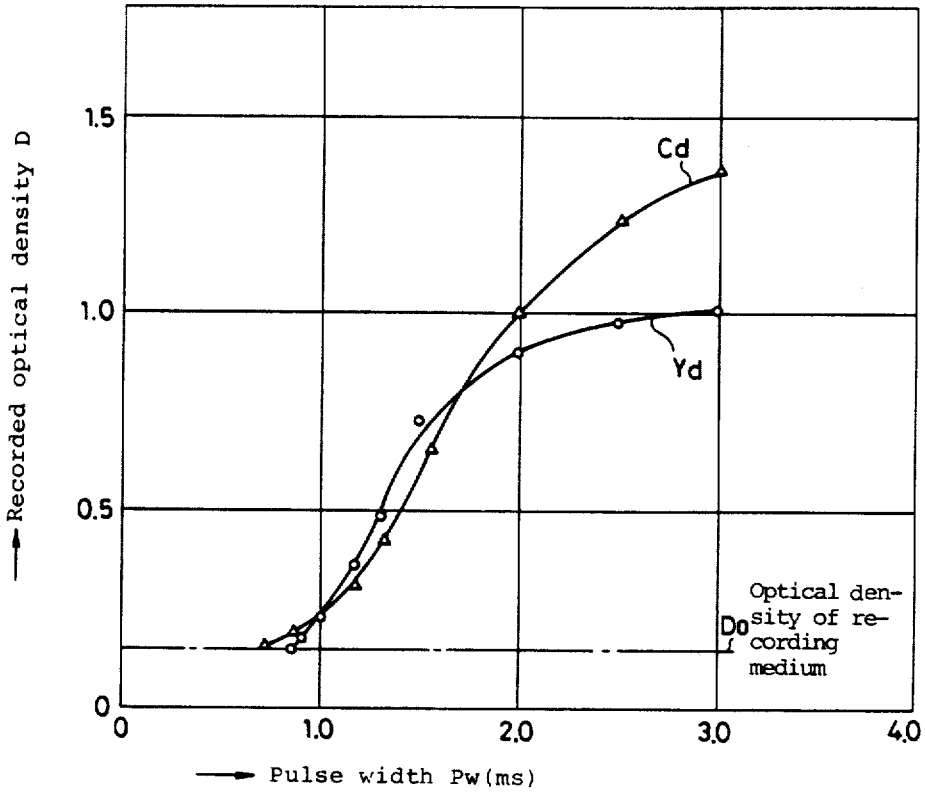
FIG. 6 is a graph showing characteristic curves of experiments of the apparatus of FIG. 3. In the graph, solid line curve Cd is a curve for the experiments when a cyan color ink transfer sheet is utilized, and the solid line curve Yd is a curve for the experiments when yellow color ink transfer sheet is utilized.

FIG. 5 and FIG. 6 are examples of experimental characteristics showing relationships between the pulse width Pw and the recorded optical density of the thermal writing pulse signal when the apparatus in FIG. 3 is used.

The recording material 120 and the solvent material 200 follow the above-mentioned Recording Material Example 1.

A capacitor paper of 13 μm in thickness is used as the base film 110, and on the surface thereof the recording material 120 of carunauba wax-color pigment series is coated by the coated amount of 4 g/m$^2$ and the thickness of about 4 μm, and the thermo-melting ink transfer temperature thereof is about 70° C. This is the publicly-known ink transfer sheet for thermo-melting ink transfer recording. Also, the recording solvent 200 is trichloroethylene whose boiling temperature is 87° C.

The thermal recording head 403 has an arrangement density of heating element 21 of 4 lines/mm, and has a heating recording part wherein a total number of 256 resistance heating elements are disposed in a linear fashion, and the sheet-shaped recording medium 300 composed of a non-coated paper of 60 μm in thickness and 500 seconds in Beck smoothness is inserted and pressure-contacted with a pressure of 1.43 kg/cm$^2$ between this recording part 410 and the recording platen composed of a rubber roller of 65° in rubber hardness and 24.5 mm in diameter. Deformation of the rubber platen 500 caused by this pressure has a role of adjusting the time of contact of the solvent material 200 with the recording material 120.

The thermal writing is performed by means of the line sequence, and the main writing line speed is 33.3 ms/line, and the paper is fed intermittently with an auxiliary scanning density of 4 lines/mm by the rotation 501 of the recording platen 500 synchronized with the main writing. For the thermal writing, a recording electrode signal whose pulse width Pw is modulated with a voltage of 13.35 V and a current of 52.4 mA (power 0.7 w) is applied to each heating element, respectively.

A recording solvent coater 600 uses a sponge-shaped roller of 10 mm in diameter, and contacts with the surface 301 of the recording paper apart from the recording part 410 of the head 403 by about 35 mm. length of circumference, and coats and impregnated the solvent material 200.

Room temperature and the temperature of the recording solvent 200 in the experiments are 27° C. Ink transfer recorded optical density D was measured corresponding to each recorded color using the reflection optical density meter (Macbeth RD 914).

FIG. 5 shows experimental characteristics when the ink transfer sheet 100 of magenta color was used.

A characteristic Mn is a publicly-known thermo-melting ink transfer recording characteristic by the so-called conventional method wherein, in FIG. 3, the coater 600 is moved as shown by the arrow mark 601 and no solvent material 200 is coated on the surface 301 of the recording paper.

FIG. 3, the temperature of each resistance heating element part of the recording head 403 rises up to a maximum of about 350° C. instantaneously corresponding to the pulse width Pw by applying the recording electric signal pulses from the apparatus 420.

This heat energy heats the recording material 120 from a back side 122 by thermal conduction through the base film back side 111 in a pressure-contact recording part 220. Accordingly, the recording material 120 starts to melt thermally with the back side 122 corresponding to the pulse width Pw, but an ink transfer recording 140 does not take place until a certain pulse width Pw which gives energy enough to melt thermally up to the surface 121 side is reached.

When this pulse width is reached, the ink transfer recording 140 takes place discontinuously, and shows binary optical density recording characteristic in principle, and therefore a continuous tone recording is difficult to be made. In this example, this stable thermo-melting transfer recording 140 starts at the pulse width Pw=Pwm=1.75 ms, and the actual layer of the recording material 120 is not uniform in thickness of coating, and thereby thicker portions are melted and transferred in sequence even at Pw>Pwn, and then the ink transfer recorded optical density D is increased, finally showing a maximum recorded optical density of 1.2 at Pw=3.5 ms.

On the other hand, the coater 600 is moved as shown by the arrow mark 602 and the solvent material 200 liquid at room temperature is coated on and impregnated into the surface 301 of the recording paper.

According to the present invention, the time of period during which coating is performed and then thermal writing is made by contacting with the recording material layer 120 and finally the recording paper 300 and the ink transfer sheet 100 are peeled off and the solubility depending upon the solvent material 200 are selected suitably, and therefore the dissolved amount on the layer surface 121 is small in a state wherein the temperature is not raised and the ink transfer optical density, that is, the fogged ink transfer is prevented. A characteristic Md is a characteristic by the thermo-dissolving ink transfer recording system in accordance with the present invention. Corresponding to the increase in Pw, consequently, the rise in temperature of the layer surface 121, the solubility into the solvent material 200, that is, the amount of thermo-dissolving recording material 130 at the pressure-contact thermal writing part 220 is increased continuously, and thereby the ink transfer recorded optical density D onto the recording paper surface 301 rises continuously from the recorded optical density D0. The pulse width at this rise is Pw=Pwd≅0.9 ms, and has no point of discontinuity as shown in the characteristic Mm, showing a possibility of continuous tone ink transfer recording. Since the boiling point (87° C.) of the solvent material 200 is higher than the melting point (≅70° C.) of the recording material 120, the conventional ink transfer recording by thermo-melting is also added in the region where Pw is large, and thereby a high sensitivity of ink transfer recording 140 is obtainable.

For example, in the characteristic Mm by the conventional method, D is 0.7 at P=Pwm=1.75 ms, while in the characteristic Md in accordance with the present invention, D is 1.05 and an optical density of 0.35 higher than that of the conventional method is obtained.

Furthermore, in the characteristic Mm, the pulse width Pw giving a maximum optical density D=1.2 is 3.5 ms, while in the characteristic Md in accordance with the present invention, D=1.2 is obtained at Pw=2.5 ms, and the ratio of pulse width Pw is 1/1.4, and therefore a 1.4—fold higher speed line sequential recording can be performed with the same optical density in comparison with the conventional method, and this shows that the power to be supplied can be saved by about 30%. In general, the life of the thermal recording head is said to decrease in proportion to —18th to 21st power of the increase in the power to be supplied, and in view of the difficulty due to the life limited by power consumption in improving the recording speed by means of the recording head configuration, it is self-evident how great the effects in accordance with the present invention are.

Thus, the excellent effects in the recording method and recording apparatus in accordance with the present invention which enable continuous tone ink transfer recording, high optical density, high speed recording and the like which are difficult to be obtained in the conventional thermo-melting recording are based on the basic principle called the thermo-dissolving ink transfer recording method wherein the solvent material 200 makes a selective thermal transfer recording in liquid state. And, it is obvious that the present method differs in principle from the conventional thermo-melting recording method wherein an extremely large melting energy has to be supplied all in the direction of the thickness of the recording material layer by means of heat conduction energy.

FIG. 6 shows a thermo-dissolving ink transfer recording characteristic in accordance with the present invention in the case where the color of the color pigment are changed to cyan or yellow based on the Recording Material Example 1 by the same experimental method as the case of FIG. 5, and the characteristic Cd is a characteristic when the ink transfer sheet 100 of cyan color is used, and the characteristic Yd is the one when the yellow sheet is used.

In both of the characteristics Cd and Yd, like the characteristic Md in FIG. 5, D rises from the recorded optical density $D_0$, thereby showing that the thermo-dissolving ink transfer recording of continuation tone can be carried out.

Furthermore, in the conventional thermo-melting ink transfer recording method wherein no solvent material 200 is coated and impregnated, a binary ink transfer recording characteristic similar to the characteristic Mm in FIG. 5 is shown, and the stable ink transfer recording pulse width Pwm is 1.5 ms for the cyan color sheet, and 1.75 ms for the yellow color sheet.

Also, the black color sheet wherein the color pigment is changed to carbon powder has the same characteristic, and the continuous tone ink transfer recording characteristic is shown in the thermo-dissolving ink transfer recording method in accordance with the present invention, and the binary ink transfer recording characteristic is shown in the conventional thermo-melting ink transfer recording method.

Furthermore, in FIG. 3, the solvent material 200 coated on the recording paper 300 has room-temperature-volatility, and becomes unnecessary after the dissolving ink transfer recording, and therefore a means for forcedly evaporating and drying can be provided such that a blowing drier 750 or the like is installed and thereby air blowing is performed at least at a temperature lower than the melting temperature of the recording material 120 or preferably at room temperature and so forth.

Thus, the above-mentioned recording materials 120 of magenta, cyan, yellow and black are coated in a stripe fashion or the like in the direction of length of the base sheet 111 in a predetermined sequence, and thus superposed ink transfer recording is performed in sequence on the surface 301 of the recording paper, and consequently by moving the coater 600 as shown by the arrow mark 601, a multi-color ink transfer recording can be made with the binary optical density by the conventional thermo-melting ink transfer recording method, and also by moving the coater 600 as shown by the arrow mark 602, a full-color ink transfer recording of continuous tone can be made to say nothing of the multi-color ink transfer recording.

In the above-described thermo-dissolving ink transfer recording of monochrome, multi-color and full color, when a dye is used as colorant the above-mentioned Recording Material Example 2 can be used, when odorless evaporation of the solvent material 200 is intended the above-mentioned Recording Material Example 4 can be used, and when the solid solvent material 200 is used at room temperature the above-mentioned Recording Material Example 5 can be used. Furthermore, when no thermo-melting ink transfer is required, the Recording Material Example 3 of high softening point can be used at which the thermo-melting ink transfer recording is difficult to be made by the normal thermal recording head.

Furthermore, when used in a cold district, water being the solvent material 200 is frozen in the Recording Material Example 2, and the material 200 is solid at room temperature in the case of the Recording Material Example 5. Accordingly, in FIG. 3, a heating means such as a resistance heater 810 or the like is installed in the solvent material container 700, and the solvent material 200 is melted and liquefied, and then coated on and impregnated into the recording paper surface 301 at a predetermined temperature through the coater 600, and further to keep this liquid state solvent material 200 at the predetermined temperature as described above, a heating means such as a resistance heater 811 or the like is installed in the recording platen.

In the recording method in accordance with the present invention, as is described above, the temperature of the liquid state solvent material 200 in contact with the non-temperature-rising part has an effect on the amount of thermo-dissolution by the thermal control writing together with fogged ink transfer. Accordingly, installation of the above-described heating means 810, 811 or the like has an advantage that a stable thermo-dissolving ink transfer recording which is not affected by the temperature of use atmosphere even when the solvent material 200 of room temperature and the liquid state is used. Furthermore, recording operation can be stabilized by setting the surface 121 at a predetermined temperature in such a manner that like 812 in the figure, before the thermal writing process, a heating roller is brought in contact with the recording material surface 121 or the like, or this roller is brought in contact with the back side 111 of the base film.

Furthermore, in the above embodiments, the solvent material 200 is coated on and impregnated into the surface 301 of the recording medium, and also by coating on the surface 121 of the recording material, coating and impregnation can be performed onto both of the surfaces 301 and 121.

Figure 7:
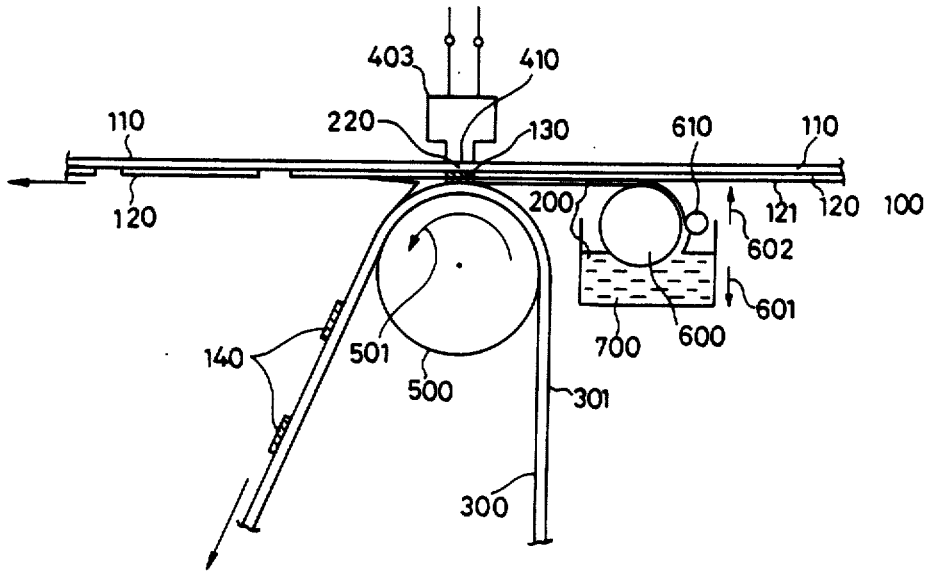
FIG. 7 is a sectional construction view of another embodiment of transfer recording method and transfer recording apparatus in accordance with the present invention.

FIG. 7 is a view showing another embodiment of the recording method and the recording apparatus in accordance with the present invention, being an example wherein the solvent material 200 is directly coated on and impregnated into the surface 121 of the recording material at a position near the pressure-contact recording part 220. The thickness, that is, the amount of the solvent material 200 to be coated on the surface 121 of the recording material is adjusted in such a manner that a solvent amount control roller 610 made of metal, rubber or the like is installed, and when the coater 600 is of sponge body, the contact pressure or the gap is adjusted, and when the coater 600 is of non-porous body such as metal, rubber or the like, the gap is adjusted.

The coated amount adjusting means such as the roller 610 can be applied likewise also in the case of FIG. 3. Also, in the case of this embodiment, when the ink transfer sheet 100 for thermo-melting ink transfer is used, by moving the coater 600 as shown by the arrow mark 601, the conventional thermo-melting ink transfer recording can be made, and by moving the coater 600 as shown by the arrow mark 602, the thermal-dissolving ink transfer recording in accordance with the present invention and further the recording using both of the thermo-dissolving ink transfer and the thermo-melting ink transfer can be carried out.

As described above, the solvent material 200 can be coated on and impregnated into either of and further both of the surface 301 of the recording medium and the surface 121 of the recording material, however, from the view point of shortening the time of contact of the liquid state solvent material 200 with the recording material 120 to prevent any fogged ink transfer, coating and impregnation into the surface 301 of the recording medium is simple.

Figure 8:
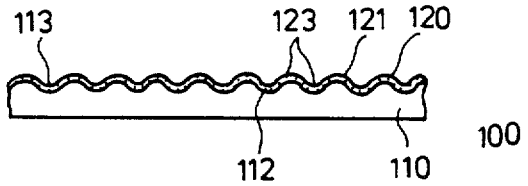
FIG. 8 is a sectional view of one example of ink recording sheet for use in the transfer recording method and transfer recording apparatus embodying the present invention.
Figure 9:
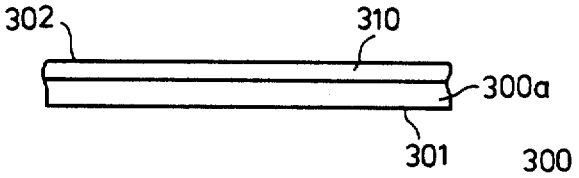
FIG. 9 is a sectional view of an example of recording medium for use in the transfer recording method and transfer recording apparatus in accordance with the present invention.
Figure 10:
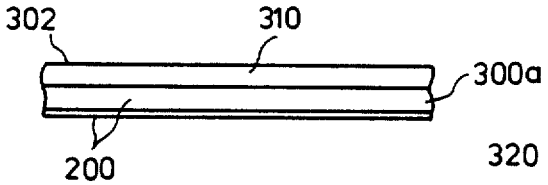
FIG. 10 is a sectional view of another example of recording medium for use in the transfer recording method and transfer recording apparatus in accordance with the present invention.

FIGS. 8, 9 and 10 are cross-sectional views of an embodiment of an ink transfer film used for the recording method and the recording apparatus in accordance with the present invention.

In making the thermal-dissolving ink transfer recording, consideration are to be given to secure the amount of the liquid state solvent material 200 enough to thermally dissolve the recording material 120 at the pressure-contact recording part 220, and further to make the thermal dissolution more effective, consideration should be given also to enlarge the area of contact of the recording material 120 with the liquid state solvent material 200. For example, a sheet having extremely smooth surface such as plastic film, art paper or the like is used for the recording medium 300, and also PET film or the like is used for the base sheet 110 and thereby the surface 121 of the recording material layer becomes extremely smooth. In such a state, the liquid state recording solvent 200 is pushed out by the contact pressure, and the absolute amount of the solvent material 200 placed between the surface 301 of the recording medium and the surface 201 of the recording material layer sometimes becomes insufficient. Accordingly, in such a case, an effective ink transfer recording 140 is difficult because the absolute amount of the thermo-dissolving recording material 130 is small in a low thermal writing temperature, and the recording characteristic moves to the higher temperature (that is, larger pulse width Pw) side. When using both of the thermo-dissolving and the thermo-melting ink transfers, an extremely high contact pressure finally leads to a recording characteristic similar to that of the thermo-melting ink transfer.

To prevent this trouble effectively, as shown in FIG. 8, for example, on the surface 112 of the base film, 110 such as PET of about 3.5–15 μm in thickness, fine unevenness 113 of about 5 μm in depth is formed so that the mechanical strength is not reduced remarkably in view of the thickness, with a density larger than that of the ink transfer recording 140 by the sand blast method, corona treating method, or chemical etching method, and on this surface, the ink transfer sheet 100 is used whereon the recording material 120 is coated, for example, by about 2–7 μm in thickness.

Thus, an unevenness 123 corresponding to the unevenness 113 is formed on the recording material surface 121, and the liquid state solvent material 200 is accomodated even in the pressure-contact recording part 220, and thereby the required amount of solvent material 200 can be secured and the area of contact of the solvent material 200 with the recording material 120 can be enlarged, and thus the thermo-dissolving ink transfer recording characteristics can be improved.

The required amount of the solvent material 200 at the pressure-contact recording part 220 can be secured also at the recording medium 300 side. For example, when a non-porous substance such as plastic film or the like is used for the recording medium 300, it is advantageous to make unevenness of about 1–5 μm in depth on the surface of the recording medium 300 by means of chemical etching, sandblast, corona treatment or the like in the same manner as the explanation in FIG. 8, or to apply a mat coat or dull coat treatment using calciun carbonate or the like. In this case, limitation in the thickness of these treated layers is loose, and, for example, coating containing not more than 20 $g/m^2$ of fine powder such as calcium carbonate or the like on the surface is performed.

As is the case with the embodiment in FIG. 3, using a porous paper for the recording medium 300 can be recommended from the viewpoint of securing the solvent material 200, and the Beck smoothness thereof is preferably 600–200 seconds.

However, as is the case with the embodiment in FIG. 3, when the solvent material 200 is directly coated on and impregnated into the surface, generally the porous recording paper is excessively impregnated with the solvent material 200 due to a good permeability to liquid thereof, and further the permeation progresses and the solvent material sometimes wrongly leaches to the back side to the recording platen 500 or adhere thereto. Such an excessive accommodation of the solvent material 200 excessively increases the heat capacity of the recording medium 300, and also the heat conductive diffusion thereof becomes excessively large, and thereby a high temperature writing control becomes difficult despite that a good thermo-dissolving ink transfer characteristic is obtainable in the low temperature region, and sometimes a high optical density of ink transfer recording becomes sufficient or the thermo-dissolving recording material 130 diffuses, resulting in a reduction in resolution of recording.

As a preferable measure for preventing such a deficiency, as shown by the cross-sectional view in FIG. 9, for the recording medium 300, PVA, polyvinylalcohol, starch or the like is coated on and impregnated into a back side 302 of a porous recording paper 300a, and then undergoes the super-calendar treatment or the like, or an oil barrier such as fluorine resin or the like (for instance, Fluorad FC-721 made by 3M or the like) is coated to apply an insoluble coating 310 for preventing permeation of the solvent to the solvent material 200. Particularly, the oil barrier treatment requires a slight amount of coating to the extent that the porosity of the recording paper 300a is not lost, and therefore an increase in heat capacity can be neglected, and particularly this method is suitable for a high optical density of thermo-dissolving ink transfer recording.

As is the case with the above-described Recording Material Example 5, when the solvent material 200 is constituted with a material which is solid at a room temperature such as solid paraffin or the like, by using a compound type recording medium wherein preliminary coating is applied on the surface of the non-porous recording medium 300 such as PET film or the like, or coating and impregnation are applied on the surface of the porous recording medium 300 such as a recording paper or the like, a simple thermo-dissolving ink transfer recording apparatus can be realized which is substantially of dry type at a room temperature. The substantial thickness (that is, amount) of the solid solvent material 200 is determined in view of the thermal solubility for the recording material 120, and normally the thickness thereof converted from the amount is selected equal to or thicker than that of the recording material 120.

When the recording medium 300 is a porous substance such as a recording paper or the like, the solid solvent material leaches out to the back side in a thermally liquefied state at coating and impregnation, or the recording material 140 which has been recorded by the thermo-dissolving ink transfer permeates to the back side, and thereby an impropriety sometimes takes place on preservation or ink transfer recording operation. To prevent such an impropriety, the use of a compound type recording medium 320 is recommended wherein, as shown in FIG. 10, the solvent material 200 which is solid at a room temperature is coated on and impregnated into the recording medium 300 in FIG. 9 composed of the porous recording paper 300a whose back side 302 is covered with the coating 310 for preventing permeation of the solvent.

Coating and impregnation of the solvent material 200 into 300a can be easily performed by utilizing a liquefied state where the temperature rises above the melting point or by using a solution.

Figure 11:
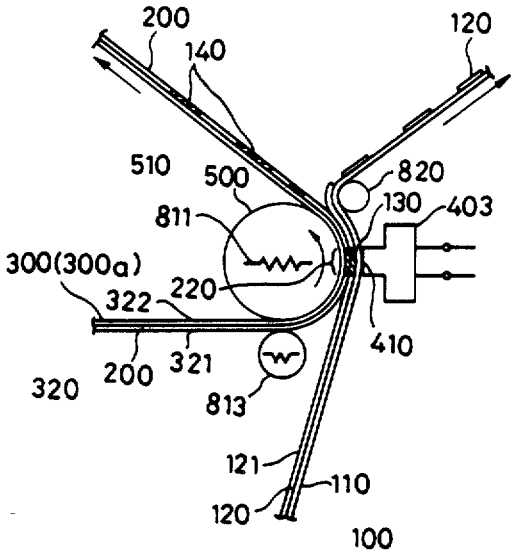
FIG. 11 is a sectional construction view of another embodiment of transfer recording method and transfer recording apparatus in accordance with the present invention.

FIG. 11 is a view showing another embodiment of the recording method and the recording apparatus in accordance with the present invention.

The present embodiment is an example using the compound type recording medium 320 as explained in FIG. 10, and the recording platen 500 is a so-called temperature-controlled recording platen incorporating the heater 811 and the like, which heats and melts the solvent material 200 being solid at a room temperature from a back side 322 of the recording medium 324, and thermally dissolves the recording material 120 at the pressure-contact recording part 220.

Furthermore, to prevent any fogged ink transfer, the melting temperature thereof is selected somewhat higher than the melting point of the solvent material 200. Furthermore, when the recording medium 320 is thick, or in a cold district, if melting at a surface part 321 is insufficient, this is improved by installing an auxiliary heating roller 813.

Furthermore, in order to prevent solidification of the solvent material 200 and thereby secure the time constant of thermal dissolution of the recording material 120 required for the liquid-state solvent material 200, corresponding to that time constant, for example, an auxiliary roller 820 is installed, and thereby the travelling time from the pressure-contact recording part 220 by means of the thermal head 403 to the position where the ink transfer sheet 100 is peeled off the compound type recording sheet 300 can be appropriately selected.

Thus, according to the present invention, as is the case with the example in FIG. 3, a recording apparatus of excellent operationability which is substantially of dry system and requires no troublesome solvent material coating or the like by the wet system can be realized, and the ink transfer recording 140 wherein the recording material 100 is thermally dissolved is obtainable.

Furthermore, for the solvent material which is solid at a room temperature, the compound type ink transfer sheet can be used wherein the solid solvent material is impregnated into the surface of the recording material or the recording material of the ink transfer sheet.

As described above, in a configuration wherein the solvent material 200 being solid at a room temperature is coated on and impregnated into the surface of the non-porous or porous recording medium 300 as shown in FIG. 11, the solid-state solvent material 200 is in a relation of increasing mutual solubility (in other words: compatibility or euteitic dissolving) to at least one continuent amount of the continuents of the recording material 120 such as the binder, colorant and the like, corresponding to the rise in temperature of the recording material 120 corresponding to the thermal writing control.

Figure 13:
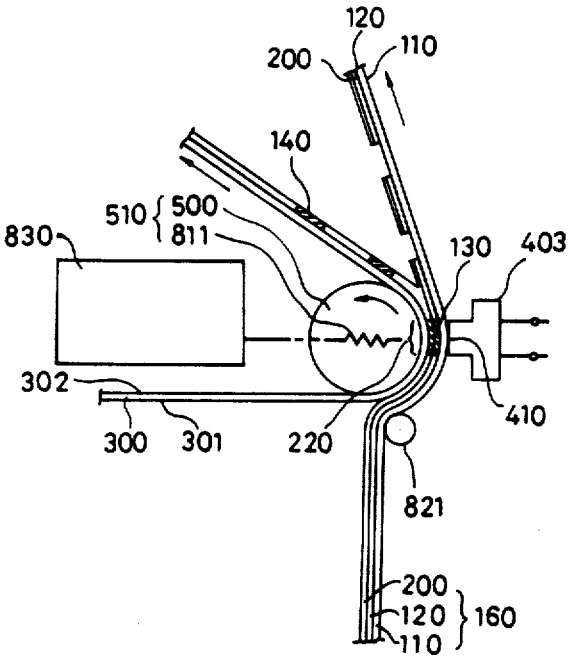
FIG. 13 is a sectional construction view of another embodiment of transfer recording method and transfer recording apparatus in accordance with the present invention.

Accordingly, in FIG. 13, when the solvent material 200 is pressure-contacted with the recording material 120 in a solid state at the pressure-contact recording part 220 and the thermal writing control is performed by the thermal recording head 403, the recording material 120 and the solid solvent material 200 mutually dissolve from the surface parts 121 and 321 respectively corresponding to this raised temperature, and the recording material 120 is transferred onto the recording medium 320 corresponding to this amount of mutual dissolution and thereby the ink transfer recording 140 is obtainable.

This method, when compared with the case of the thermal writing control by means of liquefaction of the solvent material 310, reduces the ink transfer recording sensitivity, but dispenses with melting of the solvent material 200 by means of the heater 811 or the auxiliary roller 813, having an excellent effect of realizing a simple recording apparatus by eliminating these components as required. Furthermore, according to this principle of ink transfer recording, the solvent material 200 is not required to be melted and liquefied prior to the thermal writing control, and therefore the melting point of the solvent material 200 can be selected higher or lower than or equal to the melting point of the binder material constituting the recording material 120, and thereby an advantage of easy selection of materials is also obtained. As a concrete material configuration, for example, the Recording Material Example 5 can be applied, and normally the solvent material 200 and the binder material of the recording material 120 are selected so as to dissolve mutually.

Figure 12:
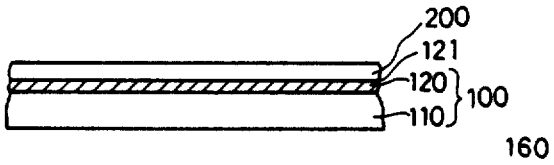
FIG. 12 is a schematical sectional view showing sectional configuration of an example of ink-transfer sheet to be used in the transfer recording method and transfer recording apparatus embodying the present invention.

FIG. 12 shows a cross-sectional structure of a compound type ink transfer sheet in the lump. A compound type ink transfer sheet 160 is constituted in such a manner that the solvent material 200 being solid at a room temperature such as solid paraffin or the like is coated on and further impregnated into the recording material surface 121 of each of the aforementioned structures of the ink transfer sheet 100, for example, the ink transfer sheet 100 wherein the recording material 120 is coated on the base film as shown in FIG. 3 or the base film having an even surface as shown in FIG. 8.

In coating and impregnating the solvent material 200, for example, the solvent material 200 which is melted by utilizing the heat cooler whose temperature is selected somewhat higher than the melting point thereof is coated on and impregnated into the ink transfer sheet 100, and immediately after that these are rapidly cooled to prevent the fogged ink transfer due to thermal dissolution of the recording material 120 into the solvent material 200.

The coated amount of the solvent material 200 is determined suitably in view of the thermal solubility of the recording material 120.

However, when the thickness of the compound type ink transfer sheet 160 becomes excessively large, thermo-melting of the solvent material 200 becomes difficult and in this process, the recording material 120 is thermally dissolved to produce the fogged ink transfer, and therefore the thickness converted from the amount of the recording material 120 is preferably selected to 2–7 μm, and the thickness of coating converted from the amount of the solid-state solvent material 200 is preferably selected to 1–7 times that of the recording material (2–49 μm).

FIG. 13 is a view showing another embodiment of the recording method and the recording apparatus in accordance with the present invention, showing an example using a compound type ink transfer sheet.

The compound type ink transfer sheet 160 is pressure-contacted with the surface 301 of the sheet-shaped recording medium 300 by means of an auxiliary roller 821. The ink transfer sheet 160 by the temperature-controlled recording platen 510 through the recording medium 300 before reaching the pressure-conact recording part 220. The temperature-controls is done by a temperature controller 830 so that the temperature of the solvent 200 is higher than the melting point and also no fogged ink transfer will take place due to thermo-dissolving of the recording material 120.

Furthermore, when the solvent material 200 is thick and is not thermo-melted easily, it can be heated in an auxiliary manner from the base film 110 side with the auxiliary roller 821 employed as a heating roller.

Thus, the recording material 120 is thermally dissolved into the liquid-state solvent material 200 corresponding to the raised temperature at the pressure-contact recording part 220 by means of the selective thermal writing by the thermal recording head 403, and this thermo-dissolved recording material 130 is transferred onto the recording medium 300 to produce the ink transfer recording 140.

In the embodiment in FIG. 3, the binder material in the recording material 120 is dissolved and diffused into the solvent material which is volatile at a room temperature, being liable to become a frosted ink transfer recording 140, while this method uses the solvent material 200 of hot-melting type wax, therefore having an advantage of obtaining a glossy ink transfer recording 140.

Figure 14:
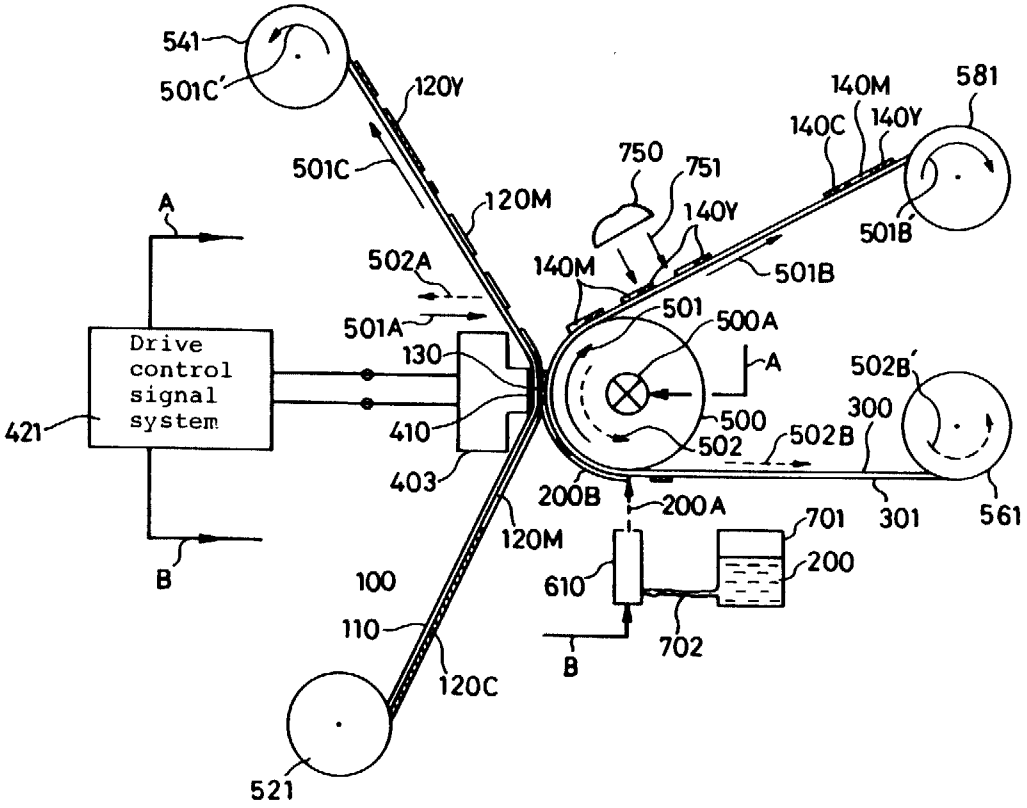
FIG. 14 is a sectional construction view of another embodiment of transfer recording method and transfer recording apparatus in accordance with the present invention.

FIG. 14 is a cross-sectional structural view showing one embodiment of the recording method and the recording apparatus in accordance with the present invention.

The sheet-shaped ink transfer sheet 100 and the recording paper 300 being a recording medium are inserted and pressure-contacted between the publicly-known linear thermal recording head 403 having the heating recording head 410 wherein a plurality of resistance heating elements are disposed in a linear fashion at equal intervals and the rubber or metal platen 500 rotated intermittently by a rotary drive system 500A.

421 is a drive control signal system, 521 is an ink transfer sheet roll, 541 is an ink transfer sheet take-up roll, 561 is a recording paper roll, and 581 is a recording paper take-up roll. For the ink transfer sheet 100, for example, the recording material of three primary colors of a yellow recording material 120Y, a magenta recording material 120M and a cyan recording material 120C are coated in the frame sequence on the surface of the sheet-shaped base film 110, 610 is a solvent flying coater which coats by flying a volatile room-temperature liquid-state solvent material 200B of thermally dissolving at least one constituent among the constituents of the above-mentioned respective recording materials 120Y, 120M and 120C onto the recording paper surface 301 in a non-contact manner as shown by an arrow mark 200A, with the width corresponding to the recording width of the linear thermal head 403. 701 is a solvent feeder which feeds the liquid-state solvent material 200 to the coater 610 as required through a feeding pipe 702.

For the flying coater 610, a publicly-known spray-type coating apparatus can be utilized such as, for example, a sprayer which sprays a liquid material such as water or the like by utilizing compressed air, a spray gun which coats a paint or the like, a dew sprayer or humidifier which sprays a liquid material such as water or the like by utilizing ultrasonic vibration, a heater or sprayer which sprays a liquid material such as water or the like by utilizing rotary centrifugal force or the like.

In the present embodiment, the thermal writing control of the recording materials 120Y, 120M and 120C is performed through the base film 110 by means of a pulse-width-modulated line sequential recording signal from the drive control signal system 421 through the recording head 403, and the recording material 130 is formed, which is thermally dissolved into the liquid-state solvent material 200B preliminary coated on the recording paper surface 301 from the solvent flying coater 610, and then line sequential primary color ink transfer recordings 140Y, 140M and 140C are performed on the recording paper surface, and thereby a full colored picture is recorded.

In such a thermo-dissolving ink transfer recording, for example, superposed recordings of the three primary color ink transfer recordings 140Y, 140M and 140C are performed in the sequence of yellow, magenta and cyan by means of the pulse-width-modulated recording signal, and thereby the analogue tone recording is performed.

First, the recording head 403 is moved as shown by an arrow mark 502A in a state wherein the leading portion of the yellow recording material 120Y is placed at the recording part 410, and then the ink transfer sheet 100 is parted from the recording paper surface 310.

The rotary drive system 500A is operated by a control signal A from the signal system 421, and the recording platen 500 is rotated as shown by the arrow mark 501, the sheet 300 is fed as shown by an arrow 501B, and the take-up roller 581 is rotated as shown by an arrow mark 501B', to start taking up, and at the same time the solvent flying coater 610 is operated by a control signal B and the solvent 200B is coated on the recording paper surface 301 in a spray shape and non-contact manner as shown by an arrow mark 200A. When this coating solvent 200B moves to the position corresponding to the recording part 410, the recording head 403 is moved as shown by the arrow mark 501A to pressure-contact the recording material 120Y with the recording paper surface 301, and the thermal writing control of the recording material 120Y is performed in the line sequence through the base film 110 with the recording head 403 by means of a pulse-width-modulated yellow recording signal from the signal system 421. The recording material 120Y is dissolved by the coating solvent 200B corresponding to the raised temperature to form the thermo-melting recording material 130. By the intermittent rotation 501 of the recording platen 500 by the rotary drive system 500A synchronized with this line sequential thermal writing, the recording paper 300 and the ink transfer sheet 100 are fed and peeled off as shown by the arrow marks 501B and 501C, and are taken up on the rolls 521 and 541 respectively as shown by arrows 501B' and 501C'.

Thus, on the surface 301 of the recording paper whereof the ink transfer sheet 104 is peeled, the yellow ink transfer recording 140Y of the optical density corresponding to the pulse-width of the yellow recording signal is obtained.

When the ink transfer recording of the yellow picture is completed, the solvent flying 200A is stopped by the control signal B. When the leading end of the magenta recording material 120M which is the next primary recording material is placed at the recording part 410, the rotation 501 of the recording platen 500 is stopped, the head 403 is moved as shown by the arrow mark 502A, the ink transfer sheet 100 is parted from the surface 301 of the recording sheet, and the paper feeding 501C is stopped.

In this state, the rotation of the rotary drive system 500A, accordingly, the recording platen 500 is reversed as shown by the arrow mark 502 by the control signal A, and the recording paper 300 is fed in reverse as shown by the arrow mark 542, being wound back on the roll 561 as shown by the arrow 502B'. When the leading portion of the yellow picture comes to the position of the solvent flying coater 601, this reverse feeding 502B is stopped. Again, the solvent flying coating 200A by means of the control signal B and the rotation 501 and a recording paper take-up 401B', by means of the control signal A are started.

When the leading portion of the yellow picture approaches the recording part 410, the head 403 moves again as shown by the arrow mark 501A, and the magenta recording material 120M is pressure-contacted with the surface 301 of the recording paper, and then registered with the above-mentioned yellow ink transfer recording 140Y, and the magenta ink transfer recording 140M is obtained in the line sequence by means of the thermo-dissolving ink transfer likewise the above-mentioned, and subsequently the cyan ink transfer recording 140C is obtained in the same manner, and thereby a full colored picture is recorded on the surface 301 of the recording paper by the thermo-dissolving ink transfer. Furthermore, it is desirable that the unnecessary coating solvent 220B remaining on each recording surface of the primary color ink transfer recordings 140Y, 140M and 140C is dried by evaporation or, for example, the blowing drier 750 is installed and warm wind or cool wind is blown onto the recording surface to perform evaporation-drying or cooling.

The above-described is an example of making a full color recording by the three primary color method, and also the four primary color method can be adopted by adding black color thereto.

The non-contact flying coating of the solvent material 200B in a liquid state at a room temperature as is the case with the present embodiment can be applied also the other embodiments as explained previously. The flying coating of the solvent material may be performed on the surface of the recording material 120M, 120C or 120Y, however, from the viewpoint of preventing the fogged ink transfer, it is recommended to perform on the surface 301 of the recording medium.

The above explanation is made by exemplifying the case of utilizing the thermal recording head, however, the above embodiments can be applied likewise also to the thermal writing control by means of rays of light using laser light rays, light emitting diodes array or the like, and also the embodiments and the description in the present specification are to be executed by suitably combining them.

As is described above, the present invention relates to a recording method and a recording apparatus based on the prinicple of thermo-dissolving ink transfer recording, and not only realizes the continuous tone ink transfer recording which cannot be performed by the conventional thermo-melting ink transfer recording method, but also realizes a high optical density of recording and a high speed of recording, and the effects thereof on industries are outstandingly great.

What is claimed is:

1. Transfer recording method comprising the steps of:

driving a recording medium in a predetermined direction, driving a recording material sheet, which comprises a base film and a recording material layer coated on one face of said base film, in substantially the same direction as that of said recording medium, in a state that the surface of said recording material layer is press-contacting to a face of said recording medium at least at a region whereon recording is to be made, applying a solvent in liquid state on at least one of said recording material layer and said recording medium, prior to said press-contacting of said surface of recording material layer to said face of said recording medium, said solvent having a lower melting point than a melting-transfer temperature of said recording material layer and such a solubility characteristic as to dissolve at least one component of said recording material, said solubility characteristic being that solubility increases as temperature rises, heating selected points of said recording material layer to a predetermined temperature thereby thermo-dissolving said selected points of said recording material layer by said solvent which is of or is made to liquid state, thereby selectively transferring thermo-dissolved selected points of said recording material layer onto said face of said recording medium, during a period of said heating to said predetermined temperature.

2. Transfer recording method in accordance with claim 1, wherein said recording material layer and said recording medium are pressed with said existence of said solvent in liquid state therebetween, and said heating is retained at least for a time period wherein said transferring selected points of said thermo-dissolved recording material layer is completed, and thereafter said recording material sheet is peeled off from said recording medium.

3. Transfer recording method in accordance with claim 2, wherein said solvent in liquid state in a predetermined temperature is made to contact onto said recording medium prior to said press-contacting.

4. Transfer recording method in accordance with claim 1, wherein time period from said applying to subsequent removal of said solvent is selected in such a length that said recording material at non-heated part does not make fog in transfer-recorded image, and said solvent is removed during a state wherein said solvent is still maintaining said liquid state.

5. Transfer recording method in accordance with claim 1, wherein recording materials of different colors are transfer-recorded in a predetermined sequential order on the same image frame of the recording medium, thereby to produce multi-color printing.

6. Transfer recording method in accordance with claim 1, wherein said heating of selected points of said recording material layer is made by thermal recording head means having a plurality of heating points.

7. Transfer recording method in accordance with claim 6, wherein said recording material sheet and said recording medium are of sheet shape, and said drivings thereof are made by inserting them into a gap between said thermal recording head means and a platen to give said press-contacting of them which are driven with said substantially the same speed and direction.

8. Transfer recording method in accordance with claim 7, wherein said recording material has thermo-dissolving property above a predetermined temperature, and said temperature is selected lower than a boiling point of said solvent.

9. Transfer recording method in accordance with claim 7, wherein said solvent is of liquid state in room temperature and has a volatility, and said applying of said solvent is made by contact-coating or fly-coating.

10. A transfer recording apparatus comprising:

first driving means for driving a recording medium in a predetermined direction, second driving means for driving a recording material sheet comprising a recording material layer coated on one face of a base film in substantially the same direction as that of said recording medium, press-contacting and peeling off means for press-contacting recording material layer onto a face of said recording medium at least at a region whereon recording is to be made and subsequently peeling off the recording material from said face of said recording medium, solvent application means for applying a solvent on at least one of said recording material layer and said recording medium prior to said press-contacting, said solvent having a lower melting point than a melting-transfer temperature of said recording material layer and such a solubility characteristic as to dissolve at least one component of said recording material, said solubility characteristic being that solubility increases as temperature rises, and heating means for heating selected points of said recording material layer to a predetermined temperature thereby thermo-dissolving said selected points of said recording material layer by said solvent which is in liquid state, thereby to selectively transferring thermo-disssolved selected points of said recording material layer onto said face of said recording medium, during a period of said heating to said predetermined temperature.

11. A transfer recording apparatus in accordance with claim 10, wherein said press-contacting and peeling off means comprises means for press-contacting said recording material layer and said face of said recording medium with said solvent in liquid phase therebetween, and means for retaining said press-contacting state at least for a time period to cover transfer recording by said thermo-dissolving.

12. A transfer recording apparatus in accordance with claim 11 which further comprising means for applying said solvent in liquid state in a predetermined temperature onto said recording medium prior to said press-contacting.

13. A transfer recording apparatus in accordance with claim 10, wherein time period from said applying to subsequent removal of said solvent is selected in such a length that said recording material at non-heated part does not make fog in transfer-recorded image, and said solvent is removed during a state wherein said solvent is still maintaining said liquid state.

14. A transfer recording apparatus in accordance with claim 11, wherein said solvent is retained in minute pores on at least one of surfaces of said recording material layer and said recording medium.

15. A transfer recording apparatus in accordance with claim 11, wherein said solvent is retained soaked in minute pores formed on porous layer formed on a sheet of non-porous recording medium.

16. A transfer recording apparatus in accordance with claim 11, wherein said recording medium is of porous sheet having means to prevent diffusion of said solvent to the rear face thereof therethrough and said solvent is retained soaked in said porous sheet at the side of front face thereof.

17. A transfer recording apparatus in accordance with claim 12 which further comprises means for liquefying said solvent from a solid state into liquid state, and retaining in said liquid state and heating it, means for applying said solvent in liquid state on at least one surface of said recording material layer and said recording medium.

18. A transfer recording apparatus in accordance with claim 12, wherein at elast one of faces of said recording material and said recording medium is retaining said solvent which is in solid state in room temperature, and said solvent is heated to change it into a liquid state prior to said application.

19. A transfer recording apparatus in accordance with claim 10 which comprises means for driving said recording material sheet in a manner that recording materials of different colors are transfer-recorded in a predetetemined sequential order on the same image frame of the recording medium, thereby to produce multi-color printing.

20. A transfer recording apparatus in accordance with claim 10, wherein said heating means is thermal recording head means having a plurality of heating points.

21. A transfer recording apparatus in accordance with claim 20, wherein said recording material sheet and said recording medium are of sheet shape, and said drivings thereof are made by inserting them into a gap between said thermal head means and a platen to give said press-contacting of them which are of driven with said substantially the same speed and direction.

22. A transfer recording apparatus in accordance with claim 21, wherein said recording material has thermo-dissolving property above a predetermined temperature, and said temperature is selected lower than a boiling point of said solvent.

23. A transfer recording apparatus in accordance with claim 21, wherein said solvent is of liquid state in a room temperature, and has a volatility, and said application means has means for contact-coating or fly-coating said solvent.

24. A transfer recording apparatus in accordance with claim 23, which further comprises selection means for switching said application of said solvent between a solvent-fed state and a solvent-stopped state, whereby in said solvent-fed state, transfer-recording is carried out by said thermo-dissolving of said recording material by said solvent, and in said solvent-stopped state, transfer-recording is carried out by mere melting and transfer of said recording material.

25. A transfer recording apparatus comprising:

first driving means for driving a recording medium in a predetermined direction, second driving means for driving a recording material sheet comprising a recording material layer coated on one face of a base film in substantially the same direction as that of said recording medium, press-contacting and peeling off means for press-contacting recording material layer onto a face of said recording medium at least at a region whereon recording is to be made and subsequently peeling off the recording material from said face of said recording medium, solvent application means for applying a solvent on at least one of said recording material layer and said recording medium prior to said press-contacting, said solvent being in solid state in room temperature and having such mutual dissolving characteristic with said recording material that amount of said mutual dissolving increases as temperature rises, and heating means for heating selected points of said recording material layer from the back side of and through said base film to a predetermined temperature thereby generating mutual-dissolving of said selected points of said recording material layer, which is contact-pressed at said press-contacting and peeling off means together with said recording medium, by said solvent, which is melted to liquid state prior to said contact pressing, thereby to selectively transferring mutual-dissolved selected points of said recording material layer onto said face of said recording medium, during a period of said heating to said predetermined temperature.

*26. Transfer recording method comprising the steps of:*

*(a) driving a recording medium having a solvent layer of solid state at the room temperature on its recording surface in a predetermined direction,*

*(b) driving a recording material sheet, which comprises a base film and a recording material layer coated on one face of said base film, in substantially the same direction as that of said recording medium, in a state that the surface of said recording material layer is press-contacting to a face of said recording medium at least at region whereon recording is to be made, said recording material layer having such a mutual solubility characteristic with said solvent that at least one component of said recording material is dissolved, said mutual solubility characteristic being that eutectic solubility increases as temperature rises, and*

*(c) heating selected points of said recording material layer to a predetermined temperature, thereby thermo-dissolving said selected points of said recording material layer by eutectic dissolution with said solvent, by said heating,*

*thereby selectively transferring thermo-dissolved selected points of said recording material layer onto said face of said recording medium.*

*27. Transfer recording method comprising the steps of:*

*(a) driving a recording medium in a predetermined direction,*

*(b) driving a recording material sheet, which comprises a base film, a recording material layer coated on one face of said base film, said recording material layer comprising colorant and binder, and a solvent layer of solid state at the room temperature in or on said recording medium layer, in substantially the same direction as that of said recording medium, in a state that the surface of said recording material layer is press-contacting to a face of said recording medium at least at a region whereon recording is to be made, said solvent having such a mutual solubility characteristic as to dissolve at least one component of the binder in said recording material layer, said mutual solubility characteristic being that eutectic solubility increases as temperature rises, and*

*(c) heating selected points of said recording material layer to a predetermined temperature, thereby thermo-dissolving said selected points of said recording material layer by eutectic dissolution with said solvent, by said heating,*

*thereby selectively transferring thermo-dissolved selected points of said recording material layer onto said face of said recording medium.*

*28. A transfer recording apparatus comprising:*

*(a) first driving means for driving a recording medium having a solvent layer of solid state at the room temperature on its recording surface in a predetermined direction,*

*(b) second driving means for driving a recording material sheet comprising a recording material layer coated on one face of a base film in substantially the same direction as that of said recording medium, said recording material layer having such a mutual solubility characteristic with said solvent that at least one component of said recording material is dissolved, said mutual solubility characteristic being that eutectic solubility increases as temperature rises,*

*(c) press-contacting and peeling off means for press-contacting said recording material layer onto a face of said recording medium at least at a region whereon recording is to be made and subsequently peeling off*

*the recording material sheet from said face of said recording medium, and*

*(d) heating means for heating selected points of said recording material layer from the back side of and through said base film to a predetermined temperature thereby generating mutual-dissolving of said selected points of said recording material layer, which is contact-pressed at said press-contacting and peeling off means together with said recording medium, by eutectic dissolution with said solvent, thereby to selectively transferring mutual-dissolved selected points of said recording material layer onto said face of said recording medium.*

*29. A transfer recording apparatus comprising:*

*(a) first driving means for driving a recording medium having a solvent layer of solid state at the room temperature on its recording surface in a predetermined direction,*

*(b) second driving means for driving a recording material sheet comprising a recording material layer which comprises colorant and binder and is coated on one face of a base film in substantially the same direction as that of said recording medium, said recording material layer having such a mutual solubility characteristic with said solvent that at least one component of said binder in said recording material is dissolved, said mutual solubility characteristic being that eutectic solubility increases as temperature rises,*

*(c) press-contacting and peeling off means for press-contacting said recording material layer onto a face of said recording medium at least at a region whereon recording is to be made and subsequently peeling off the recording material sheet from said face of said recording medium, and*

*(d) neating means for heating selected points of said recording material layer from the back side of and through said base film to a predetermined temperature thereby generating mutual-dissolving of said selected points of said recording material layer, which is contact-pressed at said press-contacting and peeling off means together with said recording medium, by eutectic dissolution with said solvent, thereby to selectively transferring mutual-dissolved selected points of said recording material layer onto said face of said recording medium.*

*30. A transfer recording apparatus comprising:*

*(a) first driving means for driving a recording medium in a predetermined direction,*

*(b) second driving means for driving a recording material sheet comprising a recording material layer coated on one face of a base film and a solvent layer of solid state at the room temperature in or on said recording material layer, in substantially the same direction as that of said recording medium,*

*(c) press-contacting and peeling off means for press-contacting recording material layer onto a face of said recording medium at least at a region between recording is to be made and subsequently peeling off the recording material from said face of said recording medium, said solvent having such a mutual solubility characteristic as to dissolve at least one component of said recording material, said mutual solubility characteristic being that eutectic solubility increases as temperature rises, and*

*(d) heating means for heating selected points of said recording material layer from the back side of and through said base film to a predetermined temperature thereby generating mutual-dissolving of said selected points of said recording material layer, which is contact-pressed at said press-contacting and peeling off means together with said recording medium, by eutectic dissolution with said solvent, thereby to selectively transferring mutual-dissolved selected points of said recording material layer onto said face of said recording medium.*

*31. A transfer recording apparatus comprising:*

*(a) first driving means for driving a recording medium in a predetermined direction,*

*(b) second driving means for driving a recording material sheet comprising a recording material layer coated on one face of a base film, said recording material layer comprising colorant and binder, and a solvent layer of solid state at the room temperature in or on said recording material layer, in substantially the same direction as that of said recording medium,*

*(c) press-contacting and peeling off means for press-contacting recording material layer onto a face of said recording medium at least at a region whereon recording is to be made and subsequently peeling off the recording material sheet from said face of said recording medium, said solvent having such a mutual solubility characteristic so as to dissolve at least one component of the binder in said recording material layer, said mutual solubility characteristic being that eutectic solubility increases as temperature rises, and*

*(d) heating means for heating selected points of said recording material layer from the back side of and through said base film to a predetermined temperature thereby generating mutual-dissolving of said selected points of said recording material layer, which is contact-pressed at said press-contacting and peeling off means together with said recording medium, by eutectic dissolution with said solvent, thereby to selectively transferring mutual-dissolved selected points of said recording material layer onto said face of said recording medium.*

*32. Transfer recording method in accordance with any one of claims 1 through 9 wherein said heating is made by irradiation of laser light on said selected points.*

*33. A transfer recording apparatus in accordance with any one of claims 10 through 25, wherein said heating means is a laser light beam irradiator for irradiating said selected points with laser light beams.*

*34. Transfer recording method in accordance with claims 26 or 27, wherein said heating is made by irradiation of laser light on said selected points.*

*35. A transfer recording apparatus in accordance with claim 28, 29, 30 or 31, wherein said heating means is a laser light beam irradiator for irradiating said selected points with laser light beams.*

* * * * *